United States Patent [19]
Yonemoto

[11] Patent Number: 5,717,458
[45] Date of Patent: Feb. 10, 1998

[54] SOLID-STATE IMAGER HAVING CAPACITORS CONNECTED TO VERTICAL SIGNAL LINES AND A CHARGE DETECTION CIRCUIT

[75] Inventor: Kazuya Yonemoto, Tokyo, Japan

[73] Assignee: Sony Corporation, Tokyo, Japan

[21] Appl. No.: 390,772

[22] Filed: Feb. 17, 1995

[30] Foreign Application Priority Data

Feb. 21, 1994 [JP] Japan ................................. 6-022803
Dec. 1, 1994 [JP] Japan ................................. 6-298584

[51] Int. Cl.$^6$ ............................ H04N 3/14; H04N 5/335
[52] U.S. Cl. .......................... 348/305; 348/301; 348/303; 348/307; 250/208.1
[58] Field of Search ............................ 348/294, 300, 348/301, 302, 303, 304, 305, 307, 308, 309, 310; 250/208.1; H04N 5/335, 3/14

[56] References Cited

U.S. PATENT DOCUMENTS

| | | | |
|---|---|---|---|
| 4,768,084 | 8/1988 | Noda et al. ........................... | 358/44 |
| 5,119,202 | 6/1992 | Hashimoto et al. ................... | 358/213.11 |
| 5,122,881 | 6/1992 | Nishizawa et al. ................... | 358/212 |
| 5,144,447 | 9/1992 | Akimoto et al. ..................... | 358/213.11 |
| 5,187,583 | 2/1993 | Hamasaki ............................. | 358/213.15 |
| 5,335,008 | 8/1994 | Hamasaki ............................. | 348/301 |
| 5,420,631 | 5/1995 | Hamasaki ............................. | 348/229 |
| 5,453,783 | 9/1995 | Weir ................................... | 348/294 |
| 5,539,461 | 7/1996 | Andoh et al. ......................... | 348/308 |

FOREIGN PATENT DOCUMENTS 61-49562  3/1986  Japan ........................... H04N 5/335

*Primary Examiner*—Andrew Faile
*Assistant Examiner*—Ngoc-Yen Vu
*Attorney, Agent, or Firm*—Hill, Steadman & Simpson

[57] ABSTRACT

A signal charge in an amplifying type solid-state imaging device of a capacitor load charge system can be detected efficiently. The amplifying type solid-state imaging device is composed of a plurality of pixel transistors, a load capacitor for accumulating signal charges of an amount corresponding to light incident on the pixel transistor, an operational amplifier having a first input terminal connected with the load capacitor element and a second input terminal to which a bias voltage is applied, a detection capacitor element connected in parallel to the operational amplifier and a reset switch (33) for resetting the detection capacitor element.

7 Claims, 28 Drawing Sheets

SOLID-STATE IMAGER HAVING CAPACITORS CONNECTED TO VERTICAL SIGNAL LINES AND A CHARGE DETECTION CIRCUIT

BACKGROUND OF THE INVENTION

The present invention relates to solid-state imagers and, particularly to an amplifying type solid-state imager of a capacitor load operation system and a method of driving the same.

As demand for enhancing resolution of a solid-state imager increases, internal amplifying type solid-state imaging devices for amplifying a charge of an optical signal at every pixel have been developed. As typical examples of the internal amplifying type solid-state imaging device, there are various kinds of imaging device structures, such as a static induced transistor (SIT), an amplifying type MOS (metal oxide semiconductor) imager (AMI), a charge modulation device (CMD) and a BASIS (base-stored image sensor) using bipolar transistors as pixels.

One of such amplifying type solid-state imaging devices will be described below. In this amplifying type solid-state imaging device, holes (signal charges) generated by photoelectric conversion are accumulated in a p-type potential well of an n-channel MOS transistor (pixel MOS transistor) and the change of a channel current based on a potential fluctuation in the p-type potential well (i.e., change of potential in the back gate) is output as a pixel signal.

FIG. 1 of the accompanying drawings shows an example of the amplifying type solid-state imaging device.

As shown in FIG. 1, an amplifying type solid-state imaging device 12 includes a plurality of pixel MOS transistors (unit pixels (cells)) 1 arrayed in a matrix fashion. The gate of each pixel MOS transistor 1 is connected to a vertical scanning line 3 selected by a vertical scanning circuit 2 composed of a shift register or the like, the drain thereof is connected to a power supply $V_{DD}$ and the source thereof is connected to a vertical signal line 5. A load MOS transistor 6 whose gate is applied with a bias voltage $V_B$ is connected between each vertical signal line 5 and the ground. A sample and hold circuit 7 for sampling and holding a pixel signal is connected to the vertical signal line 5. In FIG. 1, reference numeral 8 depicts a horizontal scanning circuit composed of a shift register or the like. The horizontal scanning circuit 8 sequentially supplies horizontal scanning pulses $\phi H$ ($\phi H_1, \ldots \phi H_n, \phi H_{n+1}, \ldots$) to the gate of a horizontal MOS switch 9 to thereby output the pixel signal supplied thereto from the sample and hold circuit 7 to the outside through a horizontal signal line 10.

In the amplifying type solid-state imaging device 12, the unit pixel, i.e., the pixel MOS transistor 1 is selected by the vertical scanning circuit 2 through the vertical scanning line 3. Then, a signal generated from a source-follower circuit composed of the pixel MOS transistor 1 and a load MOS transistor 6 connected to the vertical signal line 5 as a constant current source is sampled and held by the sample and hold circuit 7 in response to a sample and hold pulse $\phi SH$ and the horizontal MOS switches 9 connected to the horizontal scanning circuit 8 are sequentially turned on, a signal of each pixel MOS transistor 1 being output through the horizontal signal line 10.

Specifically, the selected pixel MOS transistor 1 is operated in a source-follower fashion by the load MOS transistor 6 to output the source potential through the sample and hold circuit 7 and the horizontal MOS switch 9 under the condition that a current constantly flows to the pixel MOS transistor 1. When this operation is carried out at every horizontal scanning line while the vertical scanning line 3 for scanning the pixel MOS transistor 1 is being changed, there can be obtained the signal output of the solid-state imaging device.

However, in the above-mentioned case, operation conditions of the pixel MOS transistor 1 disposed away from the load MOS transistor 6 and the pixel MOS transistor 1 disposed near the load MOS transistor 6 are changed by a distributed resistance with the result that sensitivity is deteriorated in the vertical direction.

If a constant current property of the load MOS transistor 6 operated as the constant current source is unsatisfactory, there is then the disadvantage that sensitivity of the solid-state imaging device is lowered. In other words, the load MOS transistor 6 operated as the constant current source is not always an ideal constant current source. Therefore, if the source current of the pixel MOS transistor 1 is changed, then the constant current also is fluctuated very slightly and a fluctuated amount of the constant current causes sensitivity to be lowered.

Moreover, since the constant current always flows when a signal voltage is read out from the pixel MOS transistor 1, an imaging device consumes much power.

Further, when the constant current of the load MOS transistor 6 fluctuates a vertical stripe-shaped fixed pattern noise (FPN) is generated which is difficult to eliminate by signal processing.

As a signal read circuit of an image sensor using a photoelectric conversion element of a photodiode, there is proposed a signal read circuit in which a feedback portion of a preamplifier of the signal read circuit is composed of a parallel circuit of a capacitor element and a reset switching element (see Japanese laid-open patent publication No. 61-49562). In this signal read circuit, a read transistor is turned on and off by a scanning pulse supplied from a scanning circuit during a period in which a reset switching element is set in its off-state.

The same assignee of the present application has previously proposed an amplifying type solid-state imaging device of a capacitor load operation system in which sensitivity can be made uniform, sensitivity can be increased and a power consumption can be reduced.

FIG. 2 shows an example of an amplifying type solid-state imaging device of a capacitor load operation system.

As shown in FIG. 2, an amplifying type solid-state imaging device 28 includes a plurality of light receiving elements formed of unit pixels (cells), e.g., pixel transistors, i.e., pixel MOS transistors 1 in this embodiment arrayed in a matrix fashion. The gate of pixel MOS transistor 1 of each row is connected to a vertical scanning line 3 selected by a vertical scanning circuit 2 composed of a shift register or the like, the drain thereof is connected to a power supply $V_{DD}$ and the source thereof at every column is connected to a vertical signal line 5.

A load capacitor element (load capacitor) 24 for holding a signal voltage (electric charge) is connected to the vertical signal line 5 through an operation MOS switch 23, i.e., the load capacitor element 24 is connected between the vertical signal line 5 and a first potential, i.e., the ground potential in this embodiment. An operation pulse $\phi_{RD}$ is applied to the gate of the operation MOS switch 23.

A load capacitor reset MOS switch 25 is connected in parallel to the load capacitor element 24 and a reset pulse $\phi_{RST}$ is applied to the gate of the load capacitor reset MOS switch 25.

In FIG. 2, reference numeral 8 depicts a horizontal scanning circuit composed of a shift register or the like. This horizontal scanning circuit 8 sequentially supplies horizontal scanning pulses φH (φH$_1$, ... φH$_n$, φH$_{n+1}$, ...) to the gate of the horizontal MOS switch 9 connected to the horizontal signal line 10. An output resistor 26 and a bias power supply 27 are connected between an output side of the horizontal signal line 10 and the ground.

In the amplifying type solid-state imaging device 28, during a horizontal blanking period in which a signal charge is read out from the pixel MOS transistor 1, vertical scanning signals (i.e., vertical selection pulses) φV (φV$_1$, ... φV$_i$, φV$_{i+1}$, ...) from the vertical scanning circuit 2 are sequentially applied to the vertical scanning line 3 of each row to thereby sequentially select the pixel MOS transistor 1 of each row. Also, the operation MOS switch 23 is turned on by the operation pulse φ$_{RD}$, whereby the pixel MOS transistor 1 and the load capacitor element 24 are conducted. Therefore, the instant the operation MOS switch 23 is turned on, the load capacitor element 24 starts accumulating a signal charge. If the operation MOS switch 23 is turned off after the signal voltage has been stabilized sufficiently, a signal voltage which is equivalent to a channel potential corresponding to an amount (amount of holes) of signal charges accumulated in the pixel MOS transistor 1 is held in the load capacitor element 24.

The signal voltage held in the load capacitor element 24 is flows to the horizontal signal line 10 when the horizontal MOS switches 9 are sequentially turned on by the horizontal scanning signals (i.e., horizontal scanning pulses) φH (φH$_1$, ..., φH$_n$, φH$_{n+1}$, ...) from the horizontal scanning circuit 8 during the horizontal scanning period. The signal charge which flows is output to the output side as a signal voltage due to a voltage drop of the output resistor 26.

After the read operation is finished, the reset MOS switch 25 is turned on upon application of the reset pulse φ$_{RST}$ with the result that old signal charges (holes) that had been accumulated in the load capacitor element 24 are reset, i.e., the load capacitor element 24 is reset to a predetermined voltage (e.g., ground voltage).

According to this amplifying type solid-state imaging device 28, when the signal charge is held in the load capacitor element 24, substantially no current flows to the vertical signal line 5. Therefore, the pixel MOS transistor 1 can substantially be prevented from being affected considerably by resistance of the vertical signal line 5 substantially, and a uniform sensitivity can be obtained.

Since the electric charge is held in the load capacitor element 24, a fluctuation of signal voltage can be avoided substantially unlike the load MOS transistor 6, so that a vertical stripe-shaped fixed pattern noise (FPN) is difficult to obtain.

Since the potential of the pixel MOS transistor 1 becomes a potential held in the load capacitor element 24 as it is, it is possible to increase sensitivity as compared with the case that the pixel MOS transistor 1 is driven in the stationary state, i.e., under the condition that a constant current is flowed to the channel.

Further, since the constant current is does not flow to the pixel MOS transistor 1, it is possible to reduce power consumption.

However, in the output system shown by the amplifying type solid-state imaging device 28, i.e., in the output system in which the signal charge that flows to the horizontal signal line 10 is output as the signal voltage due to a voltage drop of the output resistor 26, the output signal voltage is small and output in the form of pulse-shaped signal voltage. As a result, a switching noise of the horizontal MOS switch 9 is large and an S/N (signal-to-noise ratio) is deteriorated. FIG. 3 shows an output waveform used to explain the above-mentioned disadvantage and the output pulses supplied from the horizontal scanning circuit 8, i.e., the horizontal scanning pulses φH.

As shown in FIG. 3, a dotted line portion 15 in the output waveform depicts signal level zero. When this output waveform is added with a signal component, it becomes a solid-line output waveform 16.

SUMMARY OF THE INVENTION

In view of the aforesaid aspects, it is an object of the present invention to provide a capacitor load operation system solid-state imaging device in which signal charges accumulated in a load capacitor element can be detected efficiently.

It is another object of the present invention to provide a load capacitor operation system solid-state imaging device which is able to carry out the field read out.

It is a further object of the present invention to provide a method of driving a solid-state imaging device in which the solid-state imaging device can be driven at a high frequency.

According to a first aspect of the present invention, there is provided a solid-state imaging device which is comprised of a plurality of pixels arrayed in a matrix fashion, a plurality of vertical signal lines disposed at every column of the pixels for sending a signal of each pixel, first and second storage capacitors connected to each of the vertical signal lines in parallel to each other and a horizontal signal line for commonly connecting the first and second storage capacitors, wherein the first storage capacitors are disposed on one side of the horizontal signal line and the second storage capacitors are disposed on the other side of the horizontal signal line.

According to a second aspect of the present invention, there is provided a solid-state imaging device which is comprised of a plurality of pixels arrayed in a matrix fashion, a plurality of vertical signal lines disposed at every column of the pixels for sending a signal of each pixel, first and second storage capacitors connected to each of the vertical signal lines in parallel to each other, a first horizontal signal line for commonly connecting the first storage capacitors and a second horizontal signal line for commonly connecting the second storage capacitors, wherein the first and second horizontal signal lines are commonly connected at their one ends.

According to a third aspect of the present invention, there is provided a solid-state imaging device which is comprised of a plurality of pixels arrayed in a matrix fashion, a plurality of vertical signal lines disposed at every column of the pixels for sending a signal of each pixel, first and second storage capacitors connected to each of the vertical signal lines in parallel to each other, a first horizontal signal line for commonly connecting the first storage capacitors, a second horizontal signal line for commonly connecting the second storage capacitors, a first charge detection circuit connected to the first horizontal signal line and a second charge detection circuit connected to the second horizontal signal line.

In accordance with a fourth aspect of the present invention, there is provided a solid-state imaging device which is comprised of a plurality of pixels arrayed in a matrix fashion, each of the pixels amplifying and outputting an electric charge generated from each of the pixels when light becomes incident on each of the pixels, vertical signal lines disposed at every row of the pixel for sending a signal of each pixel, a load capacitor connected to each of the vertical signal lines, a horizontal signal line connected to the load capacitors through a horizontal switch, an integrating circuit connected to the horizontal signal line, the integrating circuit composed of an inverting amplifier, a feedback capacitor and a reset switch for resetting a potential of the feedback capacitor, a horizontal shift register for sequentially sending horizontal scanning pulses to make the horizontal switch become conductive and reset means for sending a reset pulse to make the reset switch become conductive.

DETAILED DESCRIPTION OF THE PREFERRED EMBODIMENTS

The present invention will now be described in detail with reference to the drawings.

Figure 4:
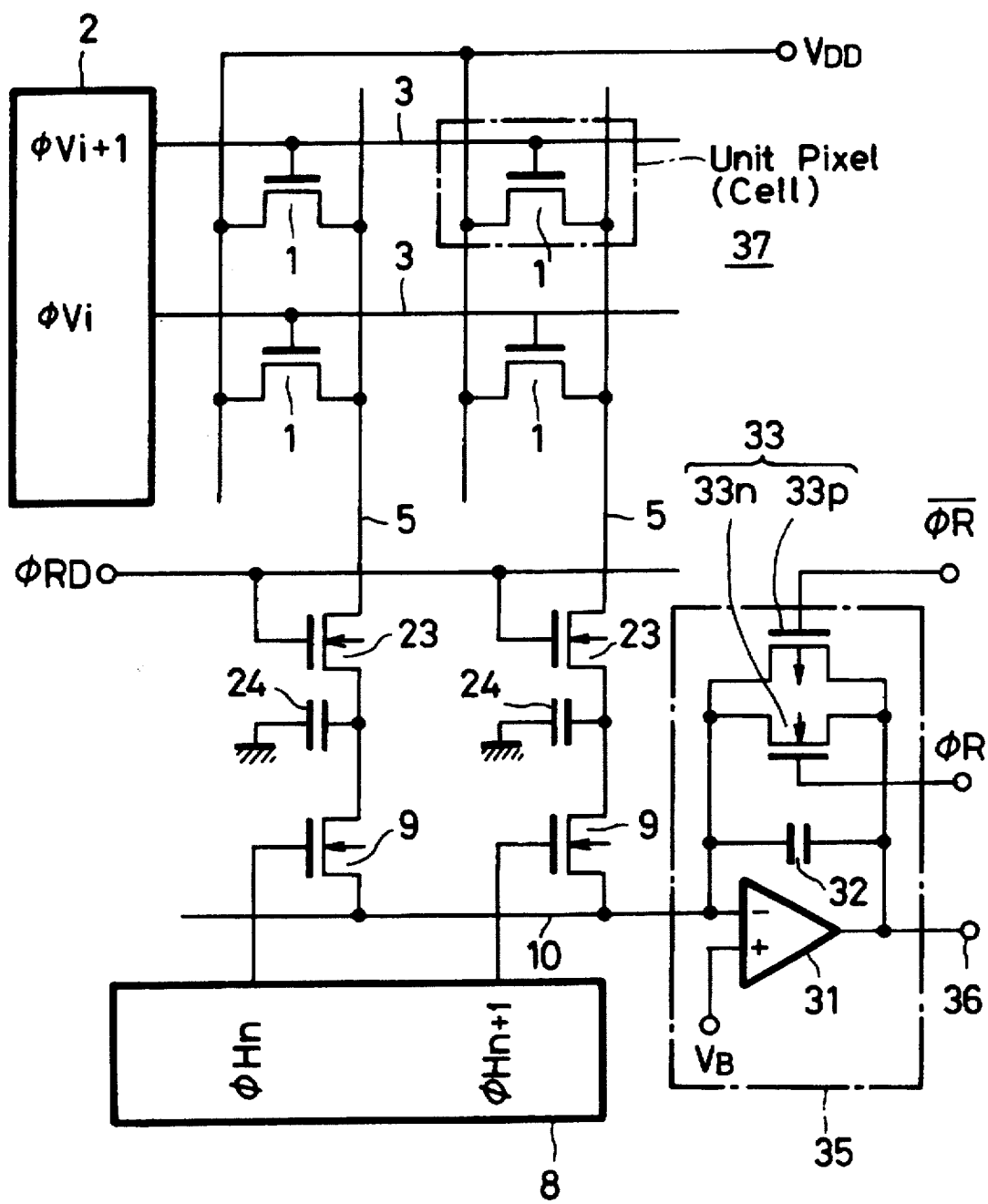
FIG. 4 is a schematic diagram showing an amplifying type solid-state imaging device according to a first embodiment of the present invention.

As shown in FIG. 4, there is provided a light receiving element 1 formed of a unit pixel (cell), e.g., a pixel transistor, i.e., pixel MOS transistor in this embodiment. There are arrayed a plurality of pixel MOS transistors 1 in a matrix fashion. There is shown a vertical scanning circuit 2 composed of a shift register or the like. A vertical scanning line 3 is connected to the gate of the pixel MOS transistor 1 of every row. The vertical scanning line 3 is connected to the vertical scanning circuit 2 to which vertical scanning signals, i.e., vertical scanning pulses $\phi V$ ($\phi V_1, \ldots, \phi V_i, \phi V_{i+1}, \ldots$) are supplied sequentially. The source of the pixel MOS transistor 1 is connected to the vertical signal line 5 of every column and the drain thereof is connected to a power supply $V_{DD}$.

A load capacitor element (load capacitor) 24 for holding a signal voltage (electric charge) is connected through an operation MOS switch 23 to each vertical signal line 5, i.e., the load capacitor element 24 is connected between the vertical signal line 5 and a first potential, i.e., the ground potential in this embodiment. An operation pulse $\phi_{RD}$ is applied to the gate of the operation MOS switch 23.

The load capacitor element 24 is connected to the drain of the horizontal MOS switch 9 and the source of the horizontal MOS switch 9 is connected to the horizontal signal line 10.

The capacitance of the load capacitor element 24 is set to be greater than that of the vertical signal line 5 (this configuration is similar in the embodiments which follow).

There is shown a horizontal scanning circuit 8 composed of a shift register or the like. The horizontal scanning circuit 8 sequentially supplies horizontal scanning signals, i.e., horizontal scanning pulses $\phi H$ ($\phi H_1, \ldots \phi H_n, \phi H_{n+1}, \ldots$) to the gate of the horizontal MOS switch 9 connected to the horizontal signal line 10 to thereby output the signal voltage held in the load capacitor element 24 to the horizontal signal line 10.

To the output end of the horizontal signal line 10 is connected a charge detection circuit 35 composed of an operational amplifier 31 using an inverting amplifier, e.g., differential amplifier, a detection capacitor element 32 and a reset switch 33.

Specifically, the horizontal signal line 10 is connected to an inverting input terminal of the operational amplifier 31 of the charge detection circuit 35. A predetermined bias voltage $V_B$ is supplied to a non-inverting input terminal of the operational amplifier 31. The bias voltage $V_B$ is used to determine the potential of the horizontal signal line 10.

The detection capacitor element 32 is connected in parallel to the operational amplifier 31, i.e., the detection capacitor element 32 is connected between the inverting input terminal and the output terminal of the operational amplifier 31. To the detection capacitor element 32 is connected the reset switch 33 which resets the horizontal signal line 10 and the detection capacitor element 32.

The reset switch 33 comprises a p-channel MOS transistor 33p and an n-channel MOS transistor 33n that are connected in parallel to each other. Reset pulses $\phi_R$ and $\phi_R\star$ are respectively applied to the gates of the transistors 33p and 33n. The reset pulse $\phi_R\star$, is the opposite phase pulse of the reset pulse $\phi_R$ and is represented as $\bar{\phi}_R$ in FIG. 5.

The operational amplifier 31 should preferably be formed of an MOS transistor because a current is not flowing.

Figure 6:
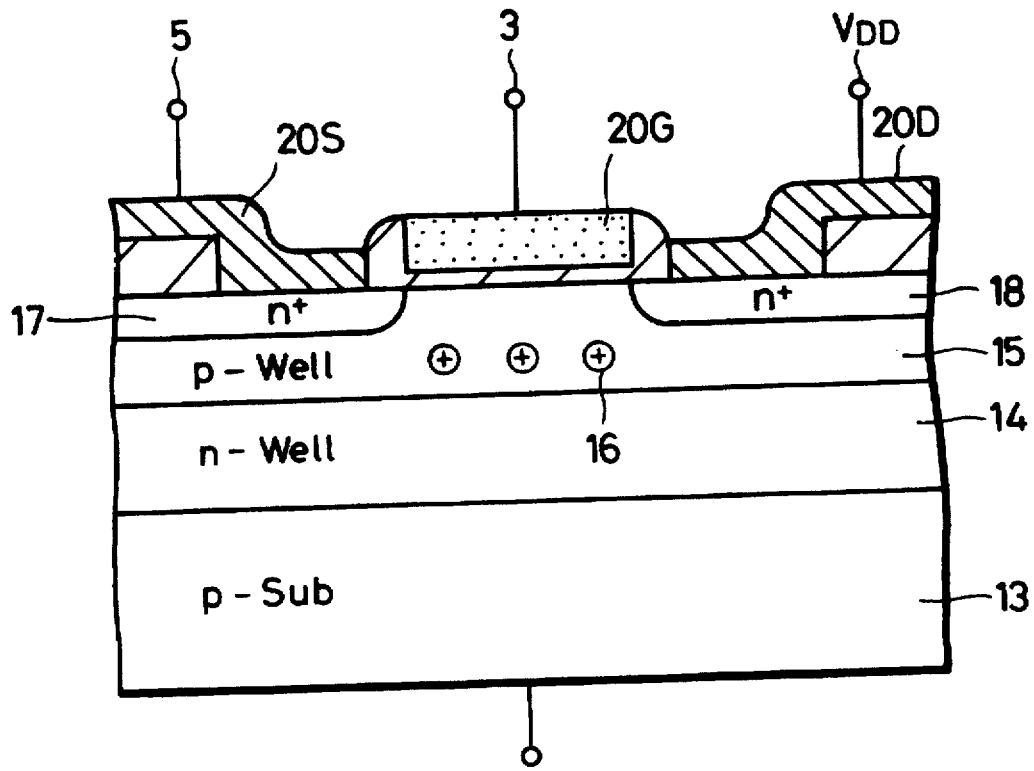
FIG. 6 is a cross-sectional view showing a semiconductor structure of a pixel MOS transistor.

FIG. 6 is a cross-sectional view showing a semiconductor structure of the unit pixel (i.e., pixel MOS transistor) 1.

In FIG. 6, reference numeral 13 designates a first conductivity-type, e.g., p-type silicon substrate, 14 a second-conductivity-type, e.g., n-type well region, and 15 a p-type well region in which there are accumulated holes (signal charges) 16 that were generated by photoelectric conversion after light had become incident on the unit pixel.

An n-type source region 17 and an n-type drain region 18 are formed on the p-type well region 15 and a gate electrode 20G of a polycrystalline silicon thin film, for example, is formed on the two regions 17 and 18 through a gate insulating film 19. The holes 16 that had been accumulated in the p-type well region 15 formed beneath the gate electrode 20G by photoelectric conversion are used to control a channel current (drain current) required in the read operation. A changed amount of the channel current becomes a signal output.

The gate electrode 20G is connected to the vertical scanning line 3, the drain electrode 20D is connected to the power supply $V_{DD}$ and the source electrode 20S is connected to the vertical signal line 5.

Figure 5:
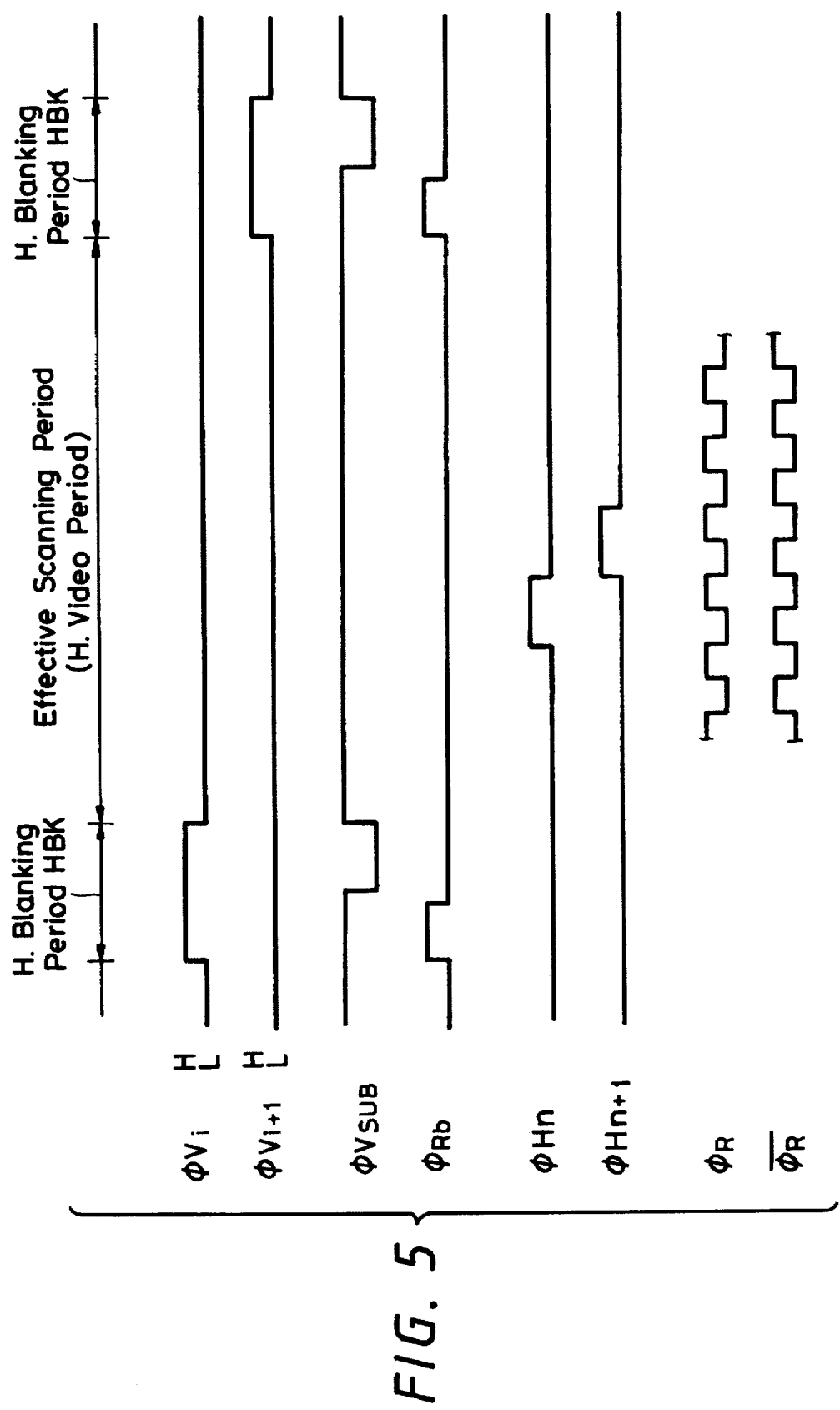
FIG. 5 is a timing chart used to explain operation of the amplifying type solid-state imaging device shown in FIG. 4.

FIG. 5 shows the operation timing chart of the amplifying type solid-state imaging device 37.

In the amplifying type solid-state imaging device 37, during the horizontal blanking period HBK, the load capacitor element 24 is held at a potential, i.e., a voltage that is equivalent to a channel potential corresponding to an amount of signal charges accumulated in the pixel MOS transistors 1. This voltage is output through the horizontal MOS switch 9 scanned by the horizontal scanning circuit 8 to the horizontal signal line 10 as a signal voltage.

Specifically, the vertical scanning pulses $\phi V$ ($\phi V_1, \ldots \phi V_i, \phi V_{i+1}, \ldots$) from the vertical scanning circuit 2 are sequentially applied to the scanning lines 3 of each row to sequentially scan the pixel MOS transistors 1 of each row. When the potential of the vertical scanning pulse $\phi V_i$ applied to the scanning line 3 of ith row, for example, is held at a high potential, the pixel MOS transistor 1 of the ith row is placed in the selected state.

A potential of the non-selected scanning line 3 is held at a low level with the result that the pixel MOS transistor 1 of other row connected to this non-selected scanning line 3 is placed in the non-selected state.

When the operation MOS switch 23 is turned on by the operation pulse $\phi_{RD}$, the pixel MOS transistor 1 of the ith row is energized and a signal is developed at the terminal of the load capacitor element 24 in response to an amount of signal charges (holes) accumulated in response to an amount of light incident on the pixel MOS transistor 1. Then, when the operation MOS switch 23 is turned off during the horizontal blanking period HBK, a signal voltage corresponding to the channel potential of the pixel MOS transistor 1 is held in the load capacitor element 24. This operation is called a capacitor load operation and is generally carried out during the horizontal blanking period HBK.

Due to the capacitor load operation effected during the horizontal blanking period HBK, the signal voltages (electric charges) supplied to and held in the load capacitor element 24 from the pixel MOS transistors 1 sequentially flow to the horizontal signal line 10 as signal charges when the horizontal MOS switches 9 are sequentially turned on by the horizontal scanning pulses $\phi H$ ($\phi H_1, \ldots \phi H_n, \phi H_{n+1}, \ldots$) (shown in FIG. 7) from the horizontal scanning circuit 8.

The signal charges flowing to the horizontal signal line 10 are demodulated by the detection capacitor element 32 of the charge detection circuit 35 using the operational amplifier 31 as a signal voltage, and are then developed at the output terminal 35 as a video signal.

When the reset switch 33 is turned on by the reset pulses $\phi_R\star$ and $\phi_R$ before the horizontal MOS switch 9 corresponding to the next pixel MOS transistor 1 is turned on, thereby the detection capacitor element 32 of the charge detection circuit 35 is thus reset. By this reset operation, the horizontal signal line 10 and the voltage across the charge capacitor element 32 are reset to the bias voltage $V_B$. Specifically, after the horizontal MOS switch 9 was turned on and the signal output of the pixel MOS transistor 1 to the output terminal 36 was finished, the reset switch 33 is turned on and reset and the detection capacitance of the charge detection circuit 35 is initialized. Then, the charge detection circuit 35 becomes ready for detecting the signal output of the next pixel MOS transistor 1.

Figure 7:
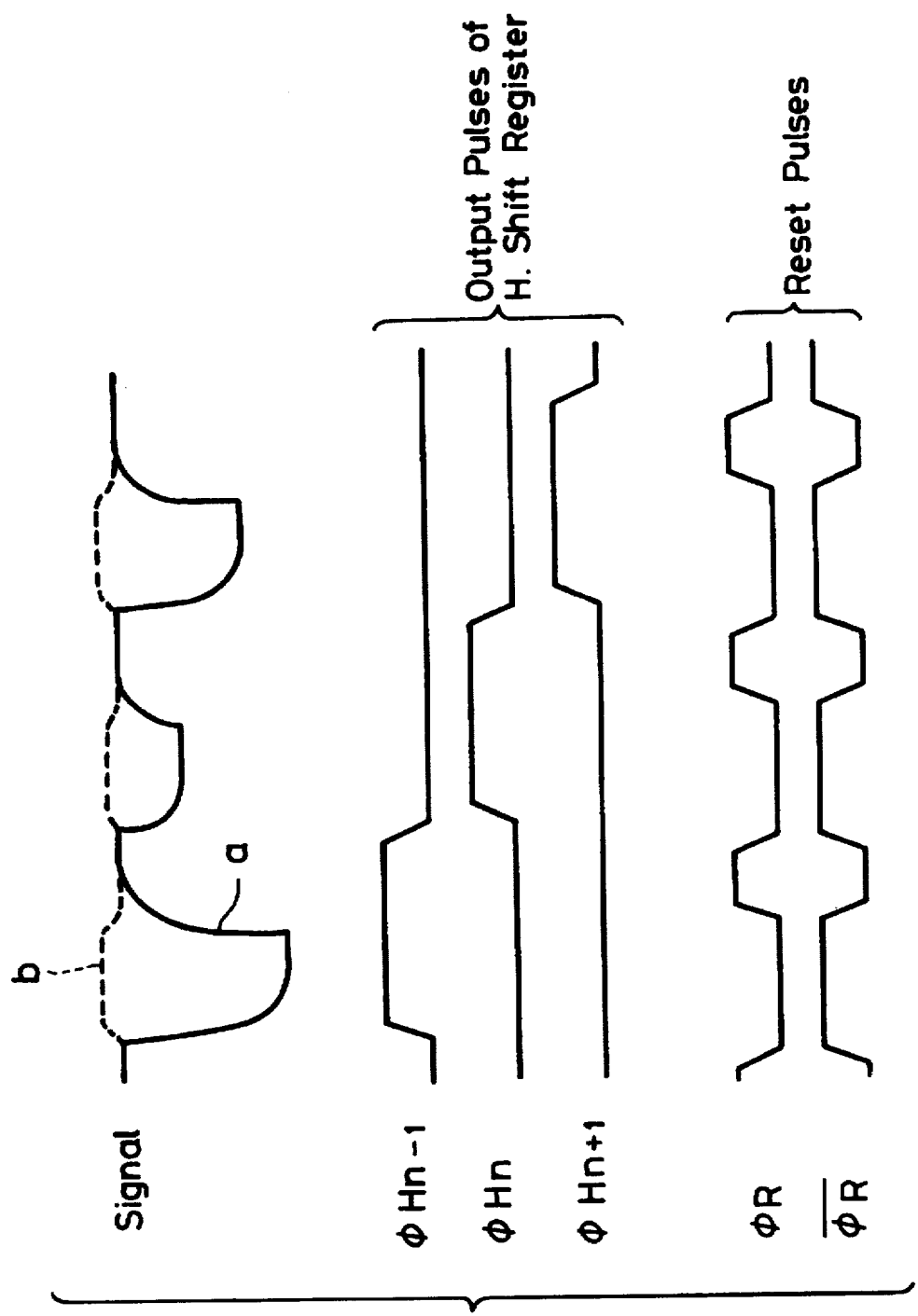
FIG. 7 is a diagram of waveforms of an output signal and pulses and to which reference will be made in explaining the amplifying type solid-state imaging device shown in FIG. 4.

FIG. 7 is a diagram showing the waveform of the signal output obtained at the output terminal 36 of the charge detection circuit 35 during the horizontal scanning period together with waveforms of the horizontal scanning pulses $\phi H$ ($\phi H_1, \ldots \phi H_n, \phi H_{n+1}, \ldots$) from the horizontal scanning circuit 8 and waveforms of the reset pulses $\phi_R\star$, $\phi_R$ of the charge detection circuit 35.

In the output waveforms shown in FIG. 7, a solid line a depicts a waveform of a signal developed at the output terminal 36 and a dotted line b depicts the voltage waveform of the horizontal signal line 10.

An analysis of the output circuit of the amplifying type solid-state imaging device 37 of the capacitor load system will be described with reference to a diagram of an equivalent circuit shown in FIG. 8.

Figure 8:
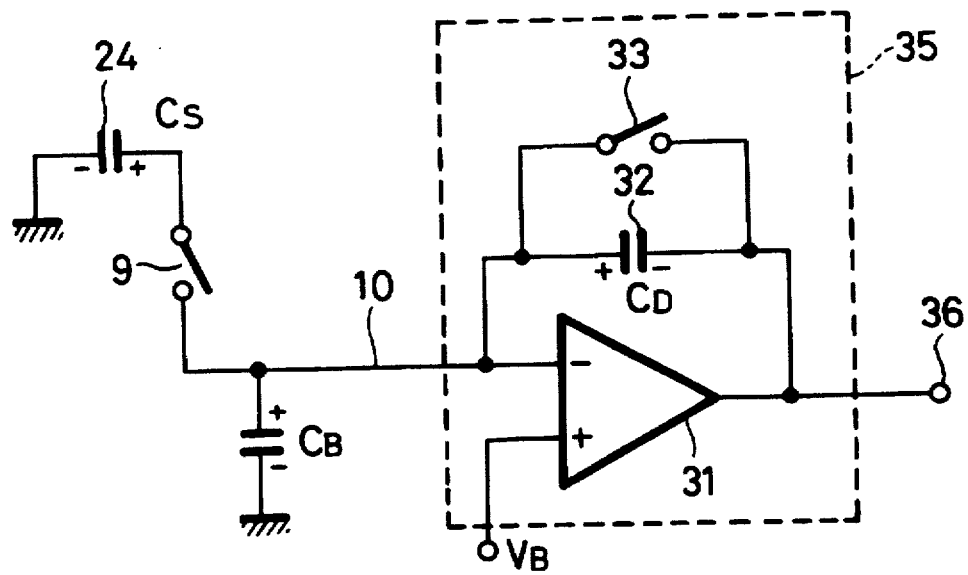
FIG. 8 is a schematic diagram showing an equivalent circuit used to explain operation of a charge detection circuit according to the present invention.

In the equivalent circuit shown in FIG. 8, Cs assumes a capacitance of the load capacitor element 24, $C_B$ assumes a stray capacitance of the horizontal signal line 10, $C_D$ assumes a capacitance of the detection capacitor element 32 of the charge detection circuit 35, and $-G$ assumes a gain of the operational amplifier 31.

In this equivalent circuit shown in FIG. 8, in the initial state the horizontal MOS switch 9 is in its off-state, the reset switch 33 is in its on-state, an initial voltage developed across the load capacitor element 24 is $V_S$, and an initial voltage of the horizontal signal line 10 and the output terminal is $V_B$. When the reset switch 33 is turned off and the horizontal MOS switch 9 is turned on from this initial state, the signal charges held in the load capacitor element 24 flow flowed to the horizontal signal line 10 and settle to the stationary state after a certain time is elapsed. In this case, $\Delta Q_{CS}$, $\Delta Q_{CB}$, $\Delta Q_{CD}$ assume the changes of electric charge amounts of the respective capacitances obtained when the electric charges settle to the stationary state and $\Delta V_{sig}$ assumes the change of potential of the horizontal signal line 10, respectively. Then, we have the following equation (1):

$$\Delta Q_{CS} = C_S \{(V_B + \Delta V_{sig}) - V_S\}$$

$$\Delta Q_{CB} = C_B \Delta V_{sig}$$

$$\Delta Q_{CD} = C_D \{\Delta V_{sig} - (-G)\Delta V_{sig}\} \quad (1)$$

A total sum of signal charges of this system is constant and the following equation (2) is established:

$$\Delta Q_{CS} + \Delta Q_{CB} + \Delta Q_{CD} = 0 \quad (2)$$

From the equation (2), a voltage change (signal voltage) $V_{out}$ of the output terminal 36 is expressed by the following equation (3):

$$\Delta V_{out} = -\frac{C_S}{C_D + \frac{1}{G}(C_S + C_B + C_D)} (V_S - V_D) \quad (3)$$

$$\therefore V_{out} = -G \cdot \Delta V_{sig}$$

Study of equation (3) reveals that, if the gain G of the operational amplifier 31 is sufficiently large, then a ratio between the output voltage (corresponding to $V_S$) of the pixel MOS transistor 1 and the output signal voltage $V_{out}$ is determined by $C_S/C_D$. Therefore, if a capacitance is set properly, then it is possible to obtain a large signal output.

Figure 1:
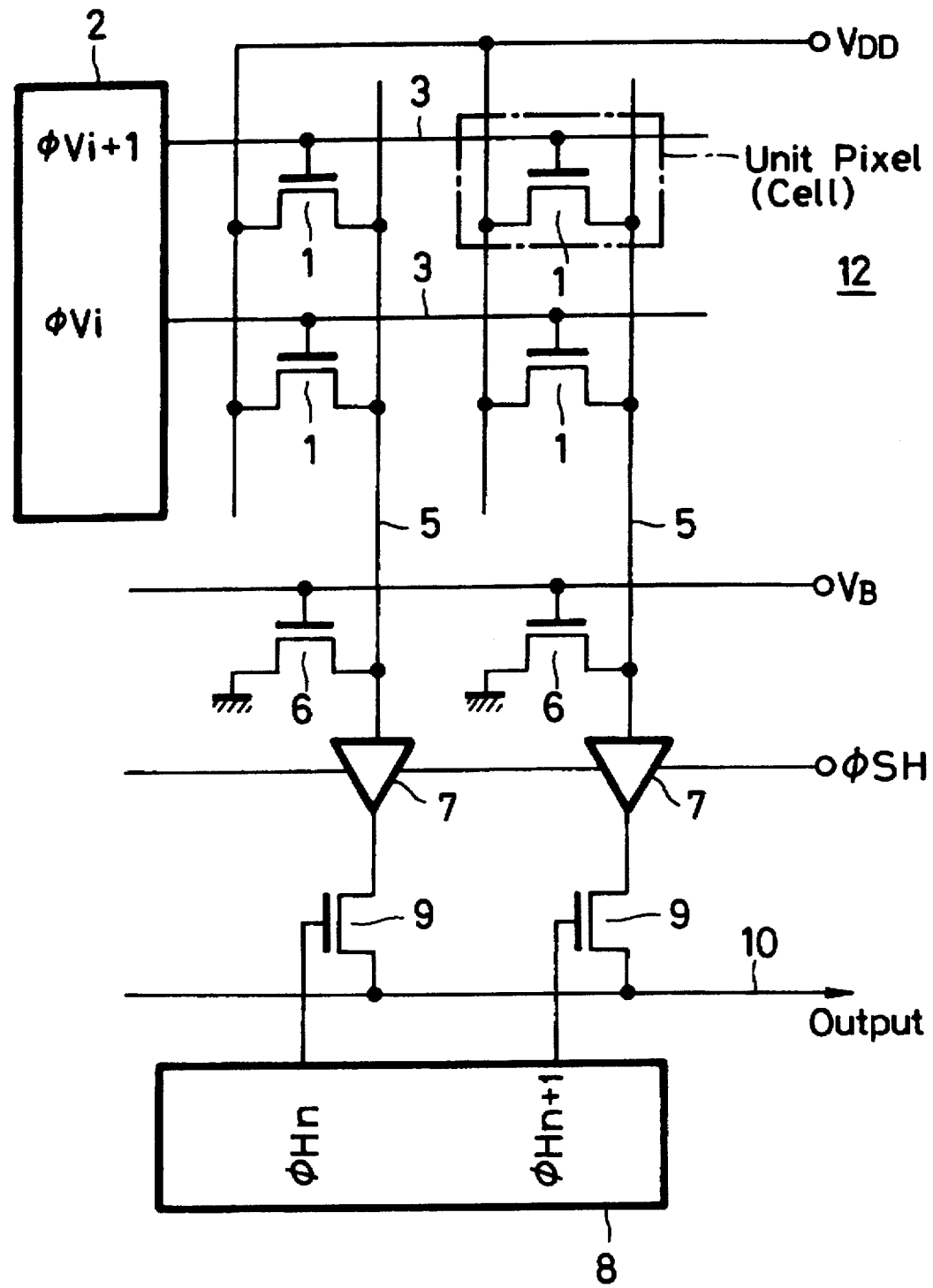
FIG. 1 is a schematic diagram showing an example of an amplifying type solid-state imaging device.
Figure 2:
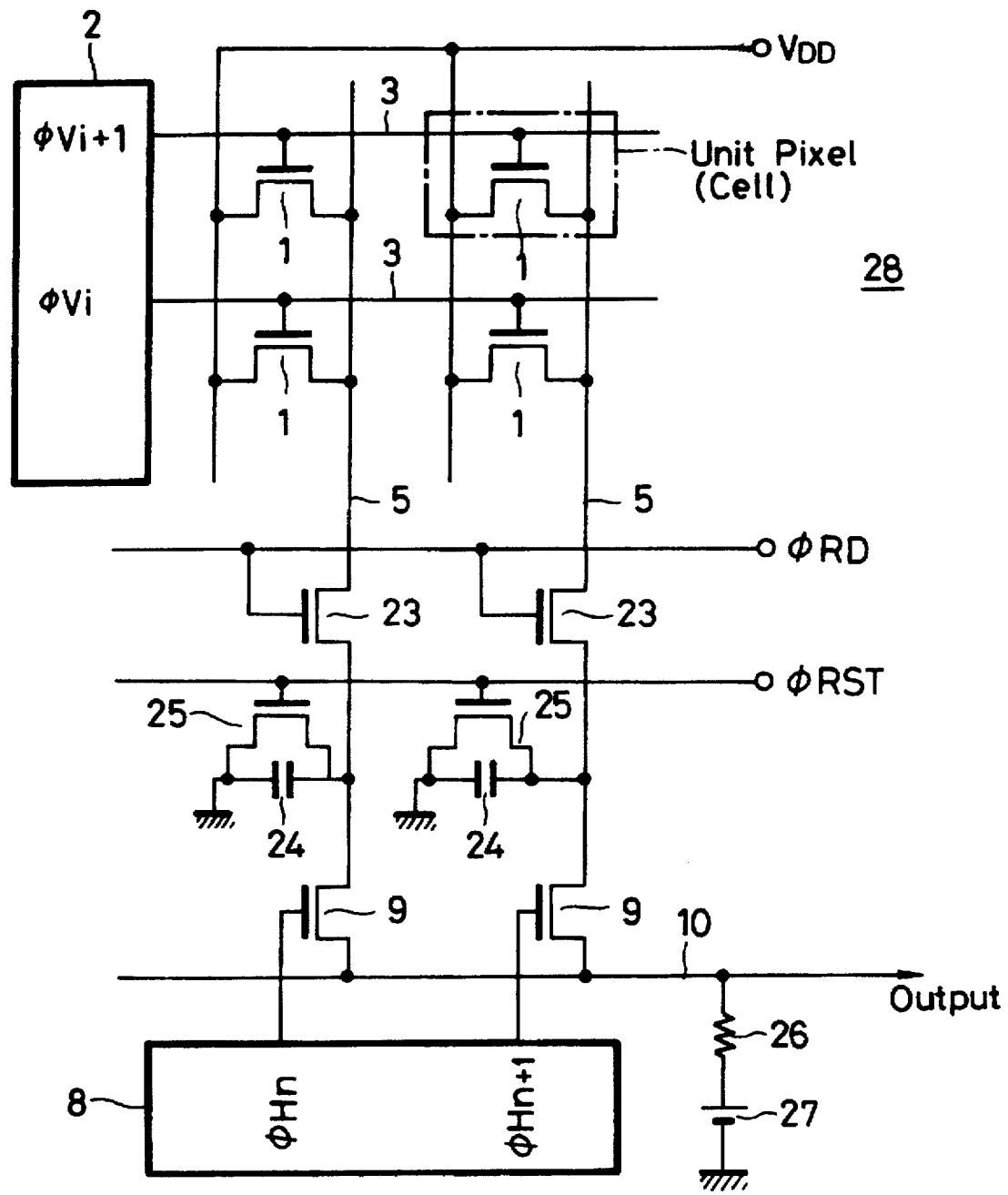
FIG. 2 is a schematic diagram showing a comparative example of an amplifying type solid-state imaging device.
Figure 3:
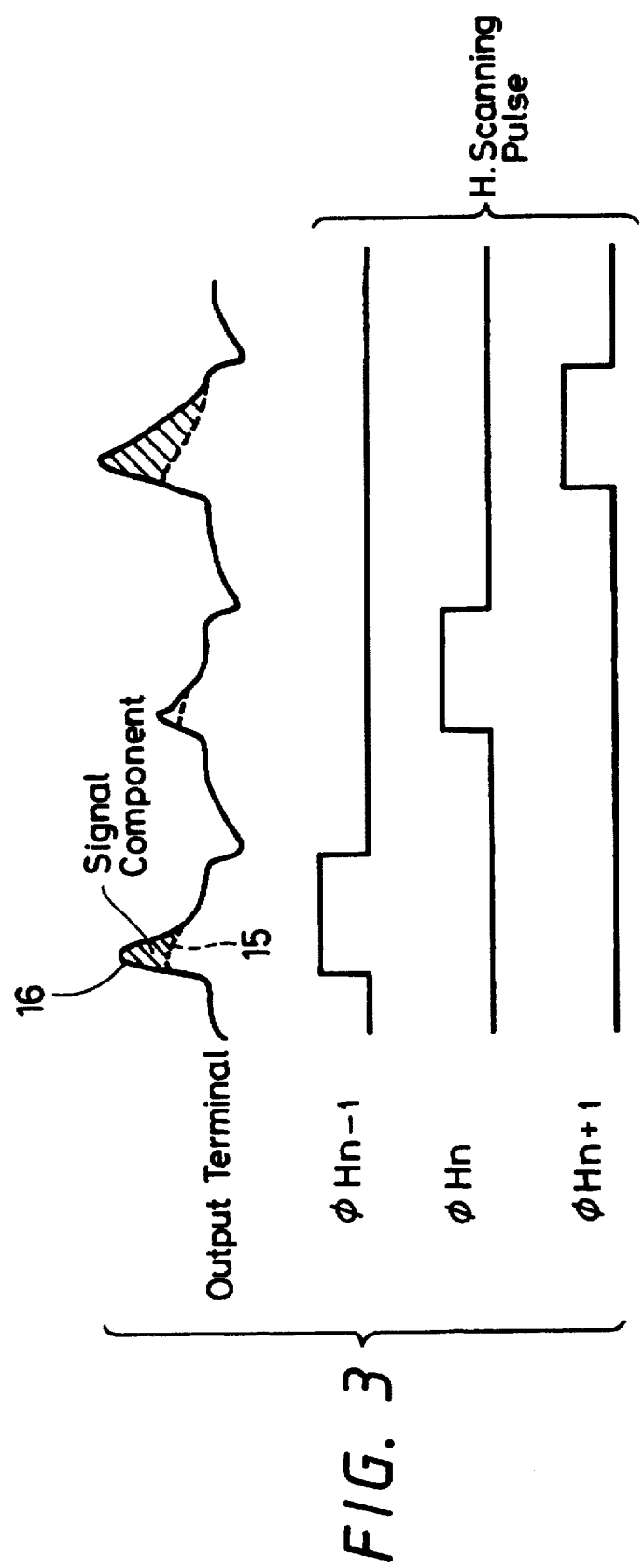
FIG. 3 is a diagram of waveforms of an output signal and pulses of the amplifying type solid-state imaging device shown in FIG. 2.
Figure 9:
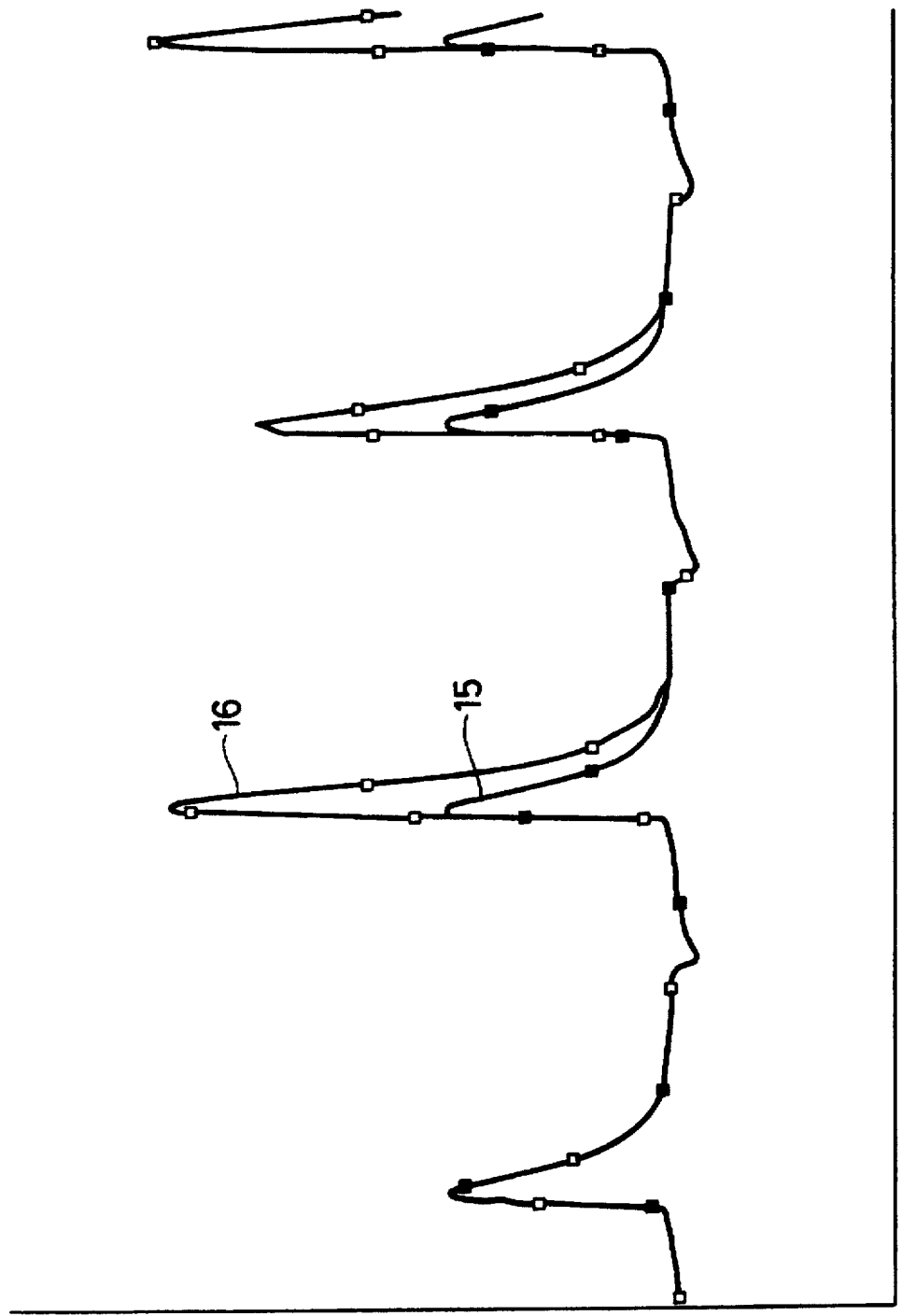
FIG. 9 is a diagram of waveforms of signals representing simulated results obtained when the amplifying type solid-state imaging device shown in FIG. 2 is driven.
Figure 10:
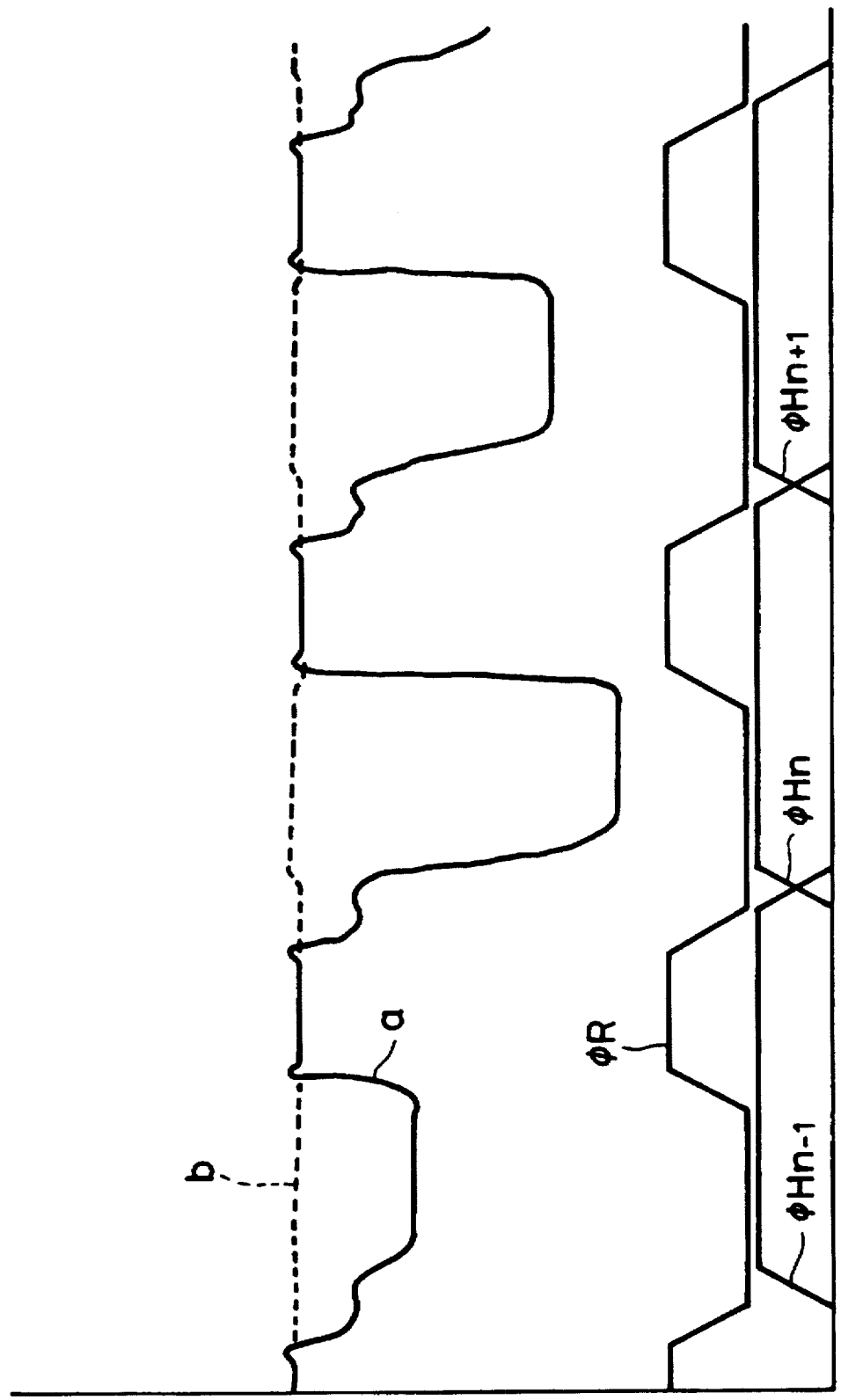
FIG. 10 is a diagram of waveforms of signals representing simulated results obtained when the amplifying type solid-state imaging device shown in FIG. 4 is driven.

FIGS. 9 and 10 show measured results obtained when the examples of the circuits shown in FIGS. 4 and 2 are driven in simulation. In an example of FIG. 9, a signal amount becomes a difference of a signal output (shown by an open square) 16 relative to a signal zero level (shown by a solid square) 15. Study of FIG. 9 reveals that the signal output has a pulse-shaped signal output waveform and is small in signal level.

On the other hand, in the example of the circuit shown in FIG. 4, as shown in FIG. 10 there can be obtained a rectangular signal output waveform a having a large signal voltage. In FIG. 10, a dotted line b represents the horizontal signal line voltage.

According to the first embodiment shown in FIG. 4, since the electric charge corresponding to the signal voltage supplied to and held in the load capacitor element 24 from the pixel MOS transistor 1 flows to the horizontal signal line 10 and the signal charge is demodulated to the signal voltage by the high-speed charge detection circuit 35 connected to the output terminal of the horizontal signal line 10, it is possible to prevent the occurrence of a spike-shaped pulse noise. Also, it is possible to considerably increase the output signal amount.

Since the amplifying type solid-state imaging device according to this embodiment does not include active elements other than the pixel MOS transistor 1 and the charge detection circuit 35, it is possible to substantially prevent the occurrence of the fixed pattern noise (i.e., FPN).

Further, since the reset switch 33 resets the detection capacitor element 32 and the load capacitor element 24 to the initial voltage $V_B$ simultaneously, it is possible to remove the reset MOS switch 25 connected to the load capacitor element 24 shown in FIG. 2.

Further, when the reset switch 33 is composed of the p-channel MOS transistor 33p and the n-channel MOS transistor 33n which are connected in parallel to each other, the reset pulses $\phi_R^*$, $\phi_R$ which are opposite in phase are simultaneously applied to the gate of the reset switch 33. Therefore, couplings at the leading edge and the trailing edge of the reset pulse cancel each other out. Thus, it is possible to obtain a uniform output signal waveform.

Incidentally, it is possible to construct the reset switch 33 by one MOS transistor.

Furthermore, if the capacitance of the load capacitor element 24 is selected to be larger than that of the capacitance of the vertical signal line 5, a so-called kTC noise can be reduced and it is possible to obtain a solid-state imaging device with satisfactory S/N. The kTC noise is a noise proportional to a product of Boltzmann constant k, absolute temperature T, capacitance C and input gate capacitance of a source-follower.

A method of driving the amplifying type solid-state imaging device 37 of the capacitor load operation system which demodulates a signal by the charge detection circuit 35, i.e., embodiment of an operation timing of a charge detection output circuit will be described below with reference to FIGS. 11 to 17.

Figure 11:
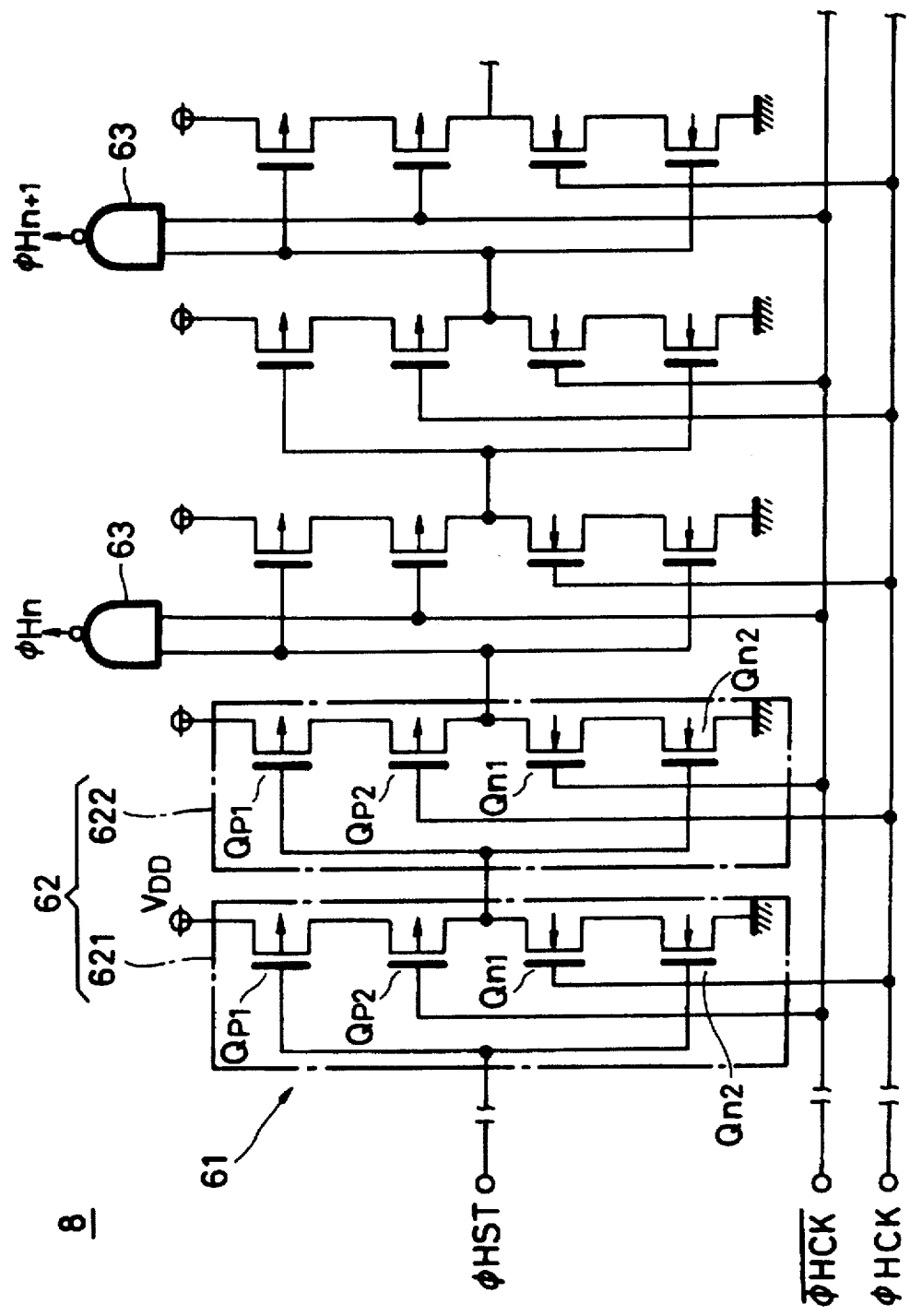
FIG. 11 is a circuit diagram showing an example of a horizontal shift register constructing a horizontal scanning circuit according to the present invention.
Figure 12:
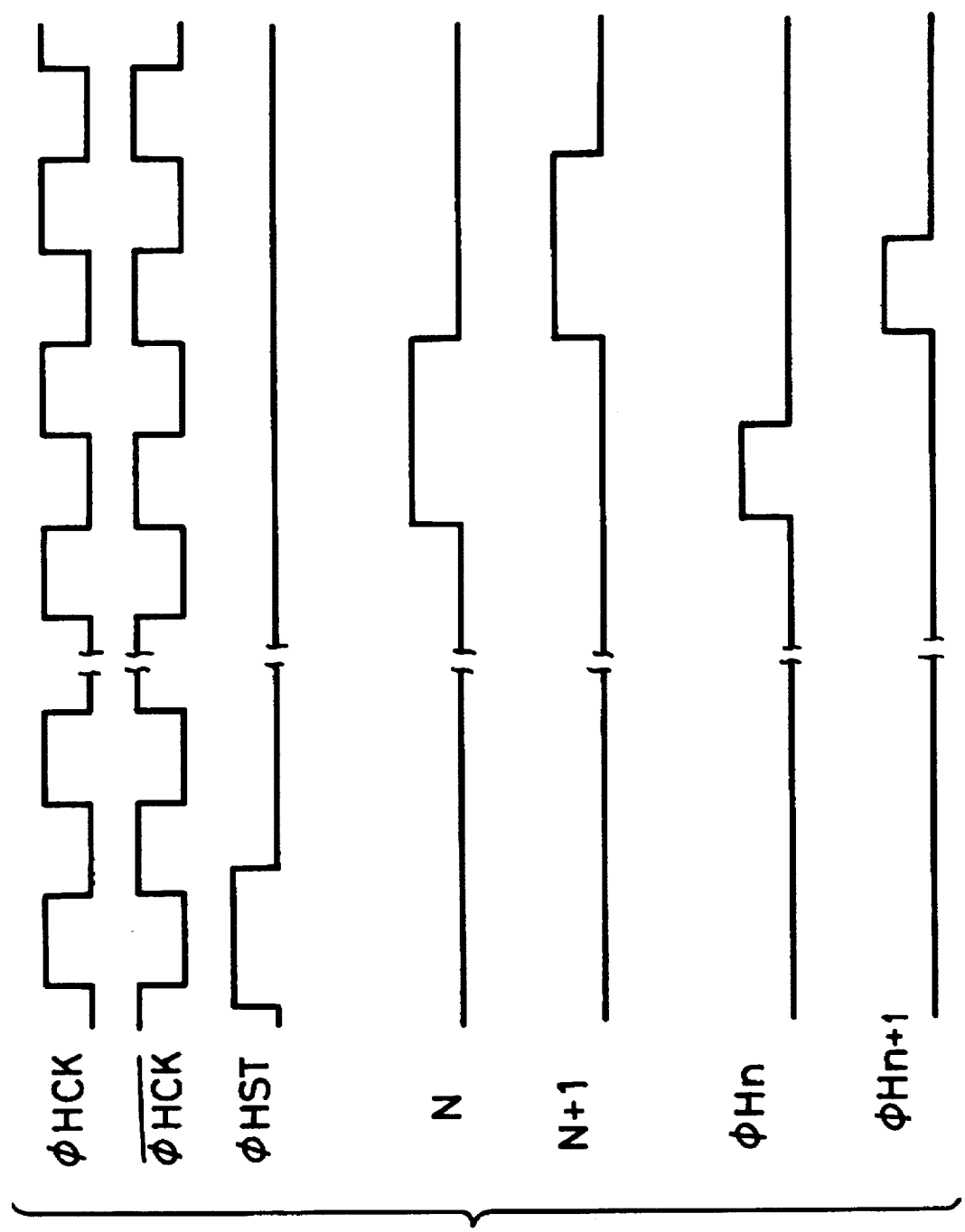
FIG. 12 is a timing chart used to explain operation of the horizontal shift register shown in FIG. 11.
Figure 13:
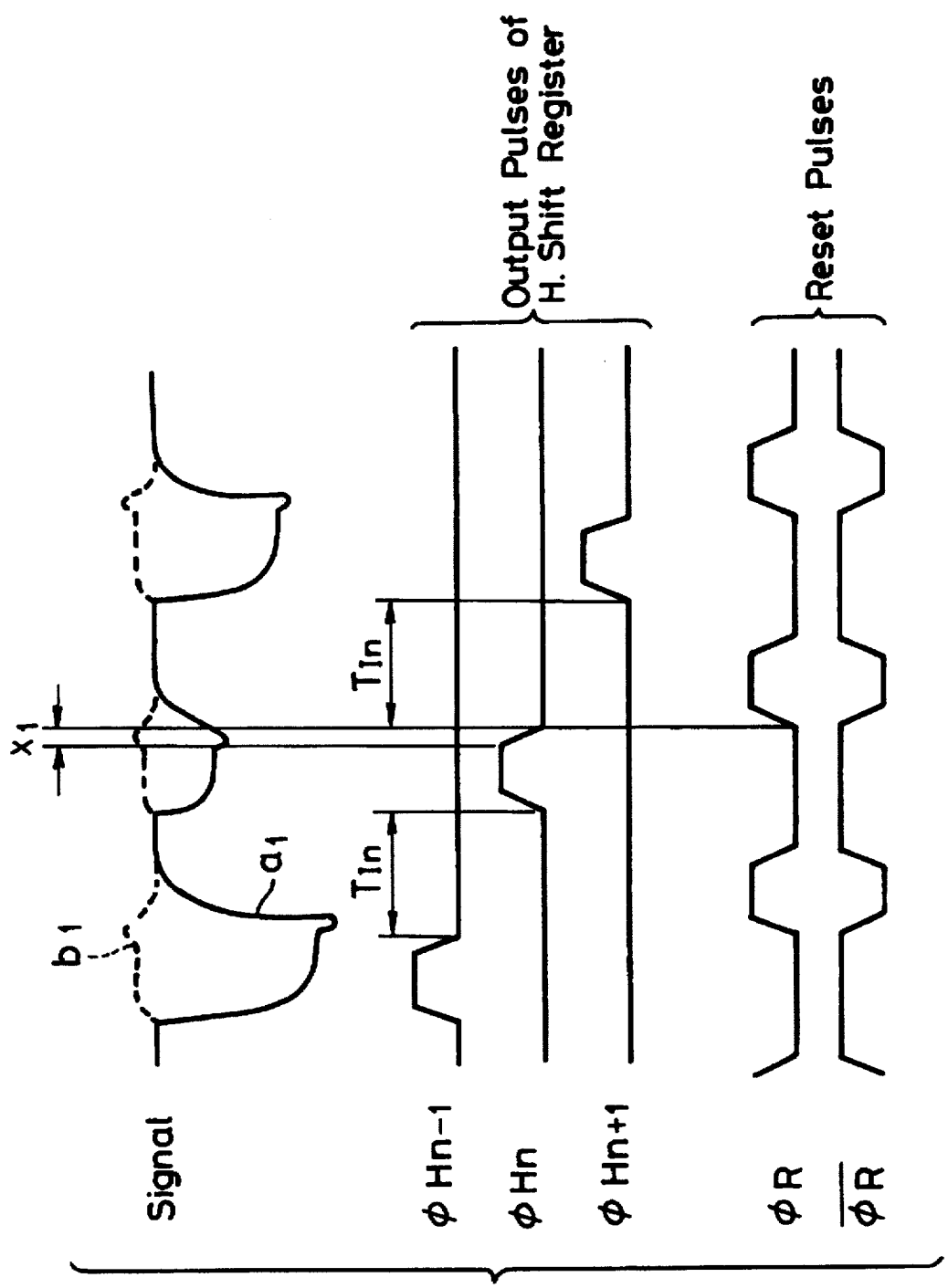
FIG. 13 is a diagram of waveforms of a signal and pulses and to which reference will be made in explaining operation of the horizontal shift register shown in FIG. 11.

FIG. 11 shows an example of a circuit arrangement of a horizontal shift register which constructs the horizontal scanning circuit 8 of the amplifying type solid-state imaging device 37. FIG. 12 is a timing chart used to explain the horizontal shift register shown in FIG. 12. FIG. 13 is a diagram of waveforms of signals obtained from the output terminal 36 of the charge detection circuit 35.

As shown in FIG. 11, a horizontal shift register 61 is comprised of a CMOS (complementary metal oxide semiconductor) dynamic register and a clock-pass gate such as a NAND circuit or the like.

Specifically, one stage of the shift register is composed of two pairs of CMOS circuits 62 (621, 622) in which a pair of p-channel MOS transistors $Qp_1$, $Qp_2$ and a pair of n-channel MOS transistors $Qn_1$, $Qn_2$ are connected in series, the drain of the first p-channel MOS transistor $Qp_1$ is connected to a power supply $V_{DD}$ and the source of the second n-channel MOS transistor $Qn_2$ is grounded and NAND circuits (i.e., clock-pass gates) 63 each formed of four MOS transistors.

The gates of the first p-channel MOS transistors $Qp_1$ and the second n-channel MOS transistors $Qn_2$ of the CMOS circuits 621, 622 are commonly connected and are then connected to the output end of the CMOS circuit of the preceding stage.

One clock pulse $\phi_{HCVK}$ of two-phase clock pulses is applied to the gate of the first n-channel MOS transistor $Qn_1$ of the first CMOS circuit 621 composing the first-stage shift register. The other clock pulse $\phi_{HCK}*$ of opposite phase is applied to the gate of the second p-channel MOS transistor $Qp_2$. Conversely, one clock pulse $\phi_{HCK}$ is applied to the gate of the second p-channel MOS transistor $Qp_2$ of the second CMOS circuit 622 and the other clock pulse $\phi_{HCK}*$ of opposite phase is applied to the gate of the first n-channel MOS transistor $Qn_1$, respectively. The pulse $\phi_{HCK}*$ is the opposite-phase pulse of the pulse $\phi_{HCK}$ and is expressed as $\phi\overline{HCK}$ in the figures.

The NAND circuit 63 is supplied at its first input terminal with outputs (... N, N+1, ...) of the second CMOS circuit 622 and also is supplied at its second input terminal with the clock pulse $\phi_{HCK}*$. There are provided a plurality of stages of shift registers of the above-mentioned circuit arrangement in response to the number of horizontal pixels.

A start pulse $\phi_{HST}$ is applied to the gates of the first p-channel MOS transistor $Qp_1$ and the second n-channel MOS transistor $Qn_2$ which are commonly connected in the first stage of the first CMOS circuit 621.

In this horizontal shift register 61, as shown in a timing chart of FIG. 12, the NAND circuit 63 of each stage outputs sequential output pulses, i. e., horizontal scanning pulses $\phi H$ ($\phi H_1, \ldots \phi H_n, \phi H_{n+1}, \ldots$) at a predetermined interval, whereby a signal $a_1$, which is not pulse-shaped, is obtained from the output terminal 36 of the charge detection circuit 35. In FIG. 13, a dotted line $b_1$ represents a horizonal signal line voltage.

In this operation timing, the horizontal signal line 10 and the detection capacitor element 32 are reset during an interval (pause period) of the horizontal pulses $\phi H$ ($\phi H_1, \ldots \phi H_n, H_{n+1}, \ldots$).

In the example shown in FIGS. 8 to 13, since the horizontal scanning pulses $\phi H$ ($\phi H_1, \ldots, \phi H_n, \phi H_{n+1}, \ldots$) obtained from the horizontal shift register 61 go to a high level with an interval $T_{IN}$, the number of transistors forming the circuit which generates such timing is unavoidably increased.

In the case of the horizontal shift register 61 shown in FIG. 8, one stage of the shift register needs 12 transistors. The clock-pass gate (NAND circuit) 63 needs 4 transistors in the 12 transistors and thus the circuit arrangement becomes complicated.

In addition, if the trailing edges of the horizontal scanning pulses $\phi H$ ($\phi H_1, \ldots \phi H_n, \phi H_{n+1}, \ldots$), the leading edge of the reset pulse $\phi_R$ and the trailing edge of the reset pulse $\phi_R*$ are displaced in phase, then a period of time in which the signal developed at the output terminal 36 is stabilized is reduced. There is then the risk that the above-mentioned horizontal shift register will become difficult to operate at high frequency.

In FIG. 13, a period from the trailing edge of the horizontal scanning pulse $\phi H$ to the leading edge of the reset pulse $\phi_R$ becomes an invalid area $x_1$.

Figure 14:
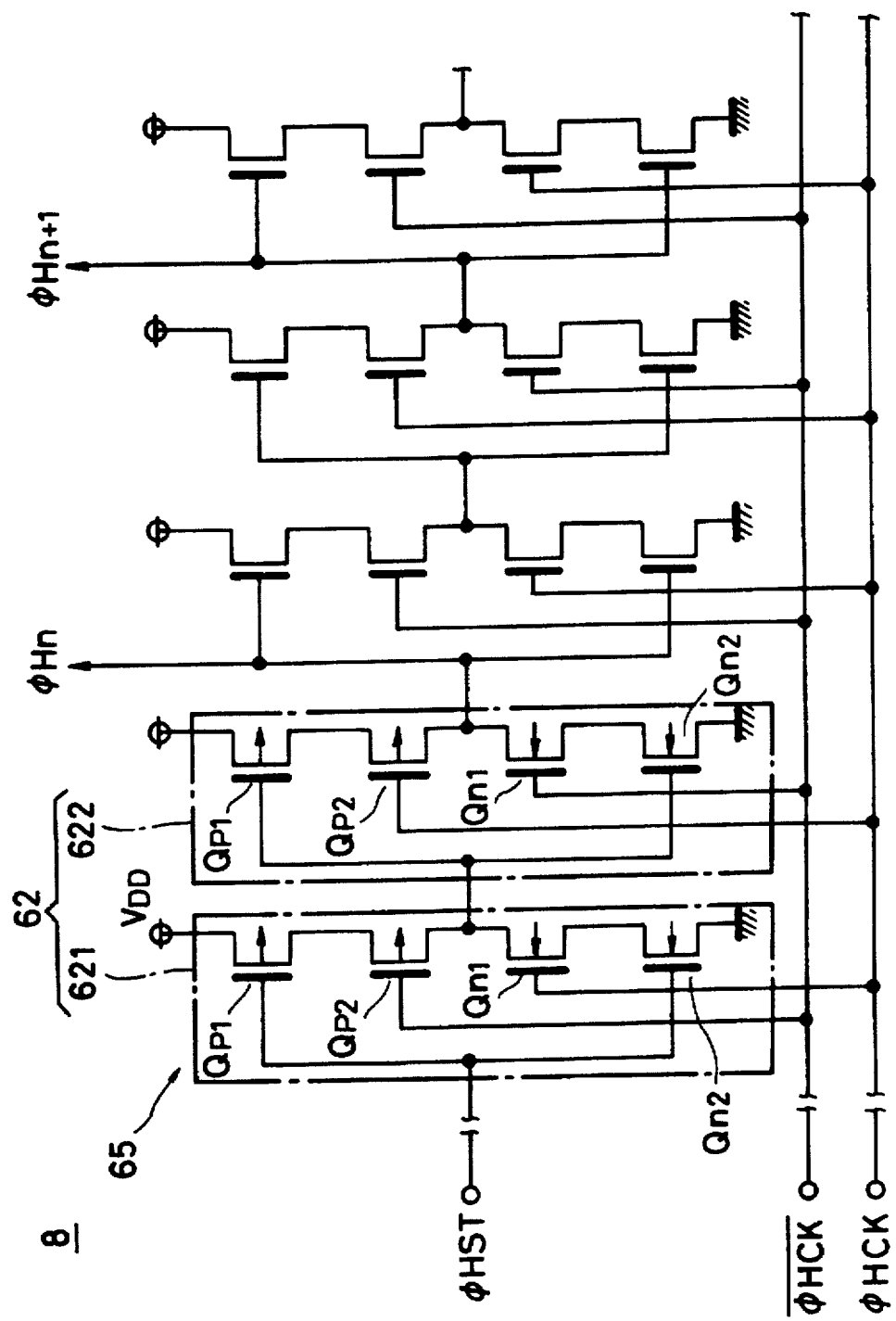
FIG. 14 is a circuit diagram showing another example of the horizontal shift register constructing the horizontal scanning circuit according to the present invention.
Figure 15:
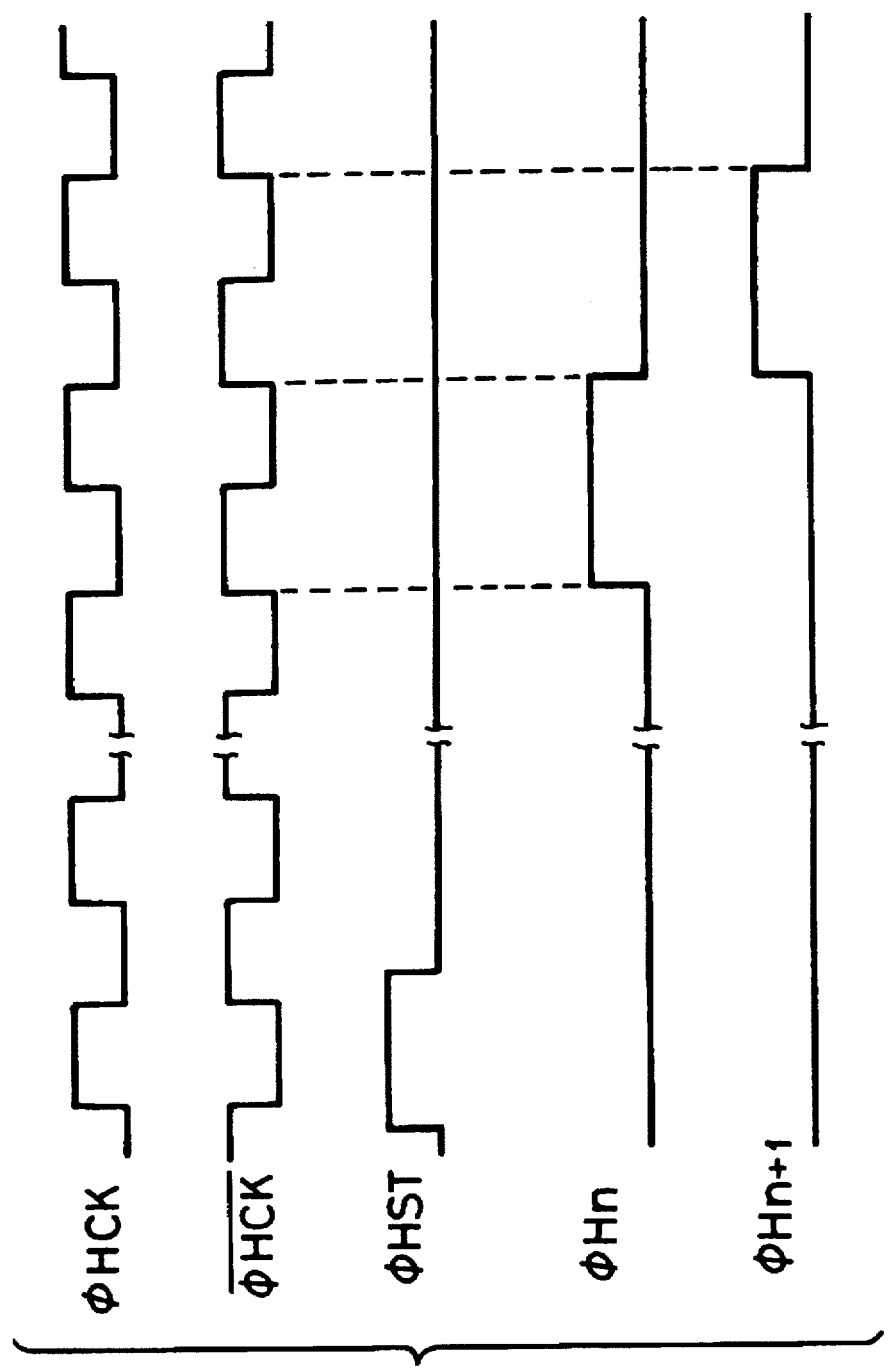
FIG. 15 is a timing chart used to explain operation of the horizontal shift register shown in FIG. 14.
Figure 16:
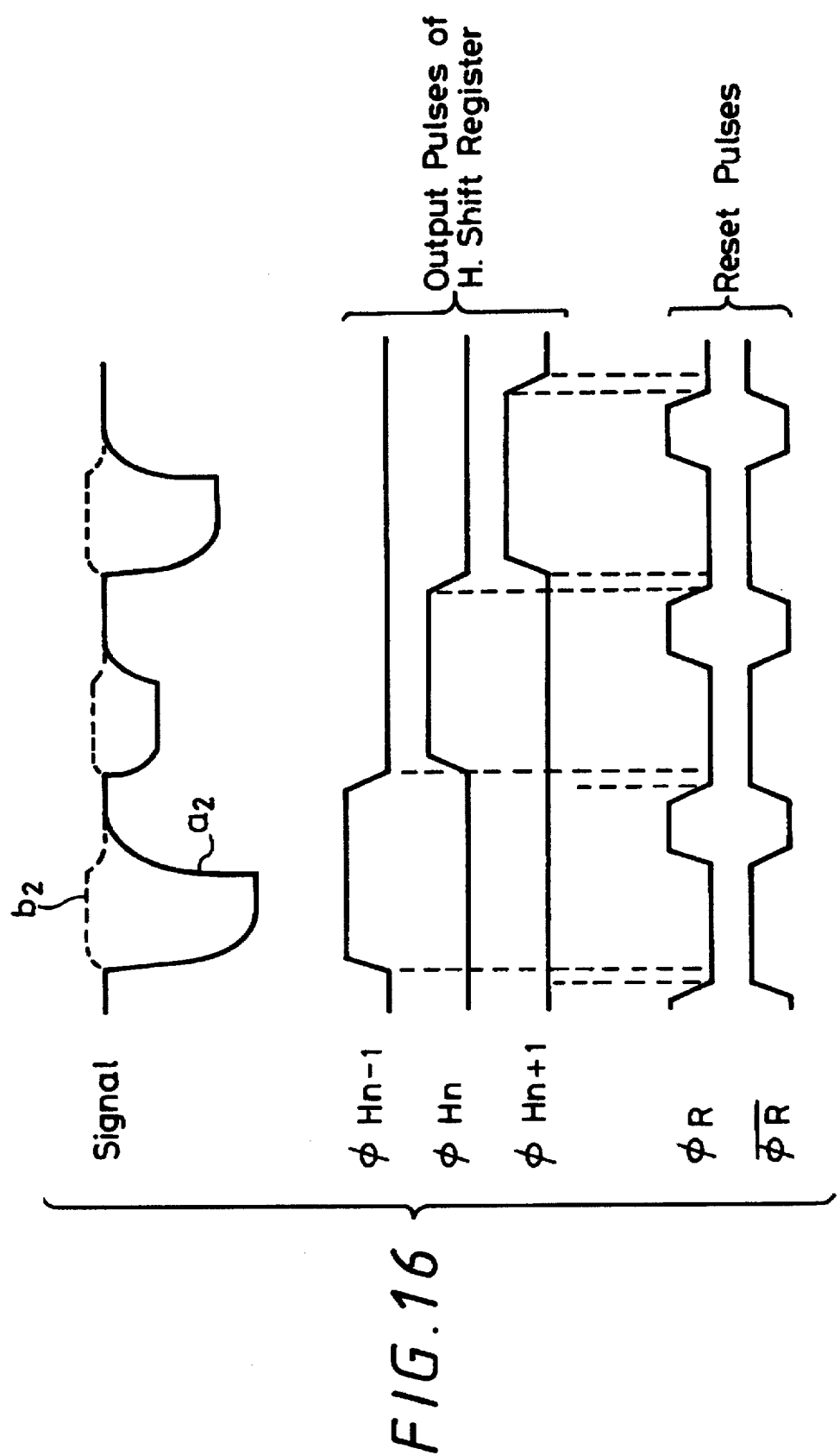
FIG. 16 is a diagram of waveforms of an output signal and pulses and to which reference will be made in explaining operation of the horizontal shift register shown in FIG. 14.

FIGS. 14 through 16 are diagrams showing another example of the operation timing which could improve the aforesaid defects. FIG. 14 is a diagram showing another example of a circuit arrangement of the horizontal shift register constructing the horizontal scanning circuit 8. FIG. 15 is a timing chart used to explain operation of the horizontal shift register shown in FIG. 14. FIG. 16 is a diagram of waveforms of signal outputs obtained from the output terminal 36 of the charge detection circuit 35.

In this embodiment, the resetting of the horizontal signal line 10 and the detection capacitor element 32 is started during the horizontal MOS switch 9 is turned on, and is ended before the horizontal MOS switch 9 corresponding to the pixel to be read next is turned on.

A horizontal shift register 65 shown in FIG. 14 is composed of a CMOS dynamic shift register.

Specifically, one stage of shift register is composed of two pairs of CMOS circuits 62 (621, 622) in which a pair of p-channel MOS transistors $Qp_1$, $Qp_2$ and a pair of n-channel MOS transistors $Qn_1$, $Qn_1$ are connected in series, the drain of the first p-channel MOS transistor $Qp_1$ is connected to a power supply $V_{DD}$ and the source of the second n-channel MOS transistor $Qn_2$ is grounded.

The gate of the first p-channel MOS transistor $Qp_1$ and the gate of the second n-channel MOS transistor $Qn_S$ of each of the CMOS circuits 621, 622 are connected commonly and are then connected to the output end of the CMOS circuit of the preceding stage.

Further, since the period in which the horizontal MOS switch 9 and the reset switch 33 are both set in the on-state can be extended, it is possible to reset the load capacitor element 24 to the initial voltage $V_B$ sufficiently.

One clock pulse $\phi_{HCK}$ of the two-phase clock pulses is applied to the gate of the first n-channel MOS transistor $Qn_1$ of the first CMOS circuit 621 constructing the first stage of the shift register, and the other clock pulse $\phi_{HCK}*$ of the opposite phase is applied to the gate of the second p-channel MOS transistor $QP_2$, respectively.

Conversely, one clock pulse $\phi_{HCK}$ is applied to the gate of the second p-channel MOS transistor $QP_2$ of the second CMOS circuit 622 and the other clock pulse $\phi_{HCK}*$ of the opposite phase is applied to the gate of the first n-channel MOS transistor $Qn_1$, respectively. An output of the second CMOS circuit 622 of each stage is applied to the gate of the corresponding horizontal MOS switch 9.

In this horizontal shift register 65, as shown in a timing chart of FIG. 15, output pulses, i.e., horizontal scanning pulses $\phi H$ ($\phi H_1, \ldots, \phi H_n, \phi H_{n+1}, \ldots$) are sequentially output from the output end of the second CMOS circuit 622 of each stage without an interval. Thus, the charge detection circuit 35 generates from its output terminal 36 a signal output $a_2$ having a long signal stabilizing period. A dotted line $b_2$ in FIG. 16 represents a horizontal signal line voltage.

In the horizontal shift register 65 in this embodiment, the shift register of one stage needs 8 transistors and the number of transistors can be reduced to ⅔ of the number of transistors used in FIG. 11. Further, as shown in FIG. 15, the horizontal signal line 10 and the detection capacitor element 32 are reset during a period in which the horizontal MOS switch 9 is in its on-state. Also, there are no pulses to which the leading edge of the reset pulse $\phi_R$ and the trailing edge of the reset pulse $\phi_R*$ have to be matched in phase. There is increased a space of the phase. Accordingly, a period in which the signal output developed at the output terminal 36 is stabilized is extended. Therefore, the horizontal shift register 65 according to this embodiment becomes able to operate at high frequency.

As a fundamental operation, similarly to the aforesaid example shown in FIGS. 11 to 14, it is necessary to determine the phase of the reset pulse $\phi_R$ so that the trailing edge of the reset pulse $\phi_R$ and the leading edge of the reset pulse $\phi_R$ are not agreed with the leading edges of the horizontal scanning pulses $\phi H$ ($\phi H_1, \ldots, \phi H_n, \phi H_{n+1}, \ldots$) output from each horizontal shift register.

Figure 17:
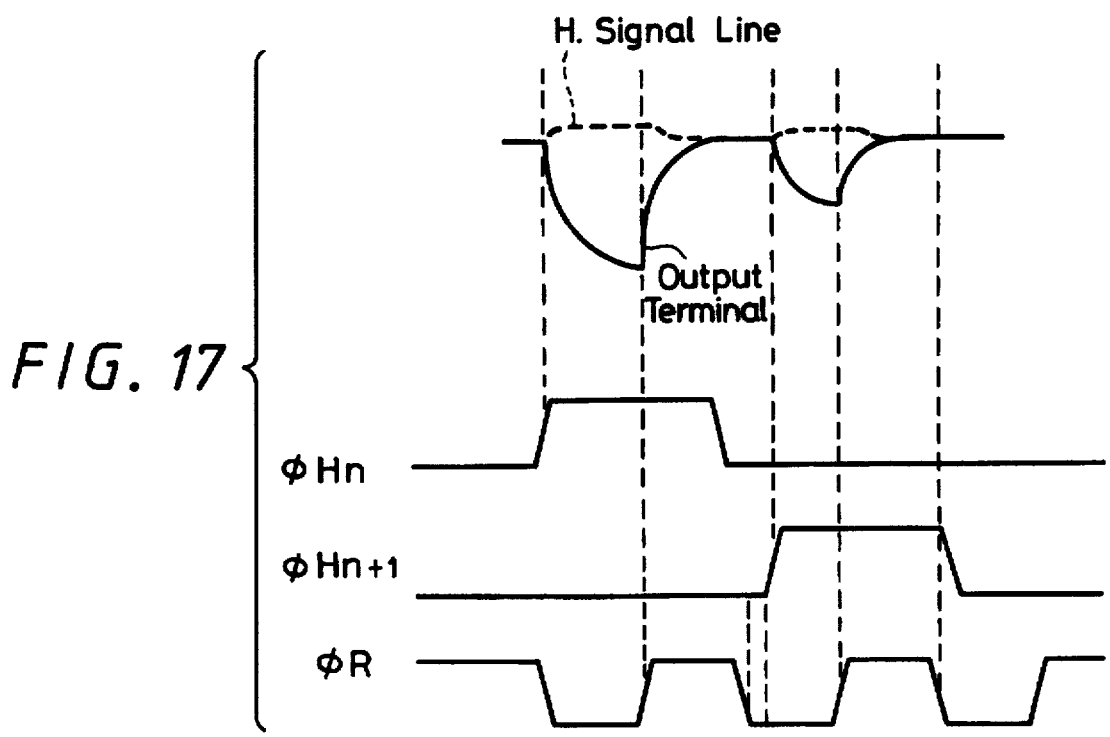
FIG. 17 is a timing chart showing another example of operation timing according to the present invention.

Further, as an operation timing, it is possible to use operation timing in which, as shown in FIG. 17, although the horizontal scanning pulses $\phi H$ ($\phi H_1, \ldots, \phi H_n, \phi H_{n+1}, \ldots$) are output at a small interval, the reset pulse $\phi_R$ rises during the horizontal MOS switch 9 is in its on-state and the reset pulse $\phi_R$ falls before the horizontal MOS switch 9 corresponding the pixel to be read next is turned on.

The fundamental operation of the amplifying type solid-state imaging device 37 has been described so far. In order to examine more closely operations from the load capacitor element 24 to the charge detection circuit 35, in the equivalent circuit shown in FIG. 8, a gain which the output signal voltage of the output terminal 36 has relative to the signal voltage held in the load capacitor element 24 will be analyzed.

A signal output voltage of the output terminal 36 relative to the signal voltage supplied to and held in the pixel MOS transistor 1 is determined by the gain $-G$ of the inverting amplifier 31 of the charge detection circuit 35. Specifically, from the equation (3) of the output signal $\Delta V_{out}$ of the charge detection circuit 35, a detected gain A of the charge detection circuit 35 relative to the output from the pixel MOS transistor is expressed by the following equation (4):

$$A = \frac{C_S}{C_D + \frac{1}{G}(C_S + C_B + C_D)} \qquad (4)$$

In order to increase the detected gain A of the charge detection circuit 35 as much as possible, the amplifying type solid-state imaging device is designed so as to maximize the gain $-G$ of the inverting amplifier 31 on the equation (4), whereby the gain A is approached to the detected gain A obtained when the gain $-G$ of the inverting amplifier 31 in the following equation (5) is infinite.

$$A = \frac{C_S}{C_D}, (G = \infty) \qquad (5)$$

In this case, however, while the upper limit of the detected gain A is determined by the above equation (5), a random noise generated from the transistor connected to the input stage of the inverting amplifier 31, in particular, is amplified by an amount of the gain $-G$, deteriorating an S/N. The following equation (6) shows this disadvantage concretely $$*V_n^2 = *V_{n\text{-}CS^2} + *V_{n\text{-}CD^2} + *V_{n\text{-}amp^2} \qquad (6)$$

$$= \frac{kT}{C_S} + \frac{1}{A^2} \cdot \frac{kT}{C_D} + \frac{G^2}{A^2} 4kT \int_{FL}^{BW} R_{eq} df$$

In the above equation (6), $*V_n^2$ is the square mean value of $V_n$ and represents the sum total of random noises developed at the output end of the charge detection circuit 35; $*V_{n,CS}^2$ is the square mean value of $V_{n,CS}$ and represents the kTC noise generated from the load capacitor element 24 when the operation MOS switch 23 is operated; $*V_{n,CD}^2$ is the square mean value of $V_{n,CD}$ and represents the kTC noise generated from the detection capacitor element 32 when the reset switch 33 is operated; $R_{eq}$ is the equivalent noise resistance converted on the input side of the inverting amplifier 31; BW is the frequency band width of the, inverting amplifier 31; and $F_L$ is the cutoff frequency.

The second equation of the equation (6) expresses the sum total of the random noises developed at the output terminal of the charge detection circuit 35 in the converted form of noises generated across the load capacitor element 24.

Study of equation (6) reveals that, of the random noises of the converted form generated across the load capacitor element 24, the random noise $*V_{n,Amp}^2$ generated from the inverting amplifier 31 is proportional to the gain $-G$ of the inverting amplifier 31. Specifically, even when the gain $-G$ of the inverting amplifier 31 is increased, such a gain $-G$ is increased up to the detected gain A of the upper limit given by the equation (5) at best. Conversely, the random noise $*V_{n,Amp}^2$ generated from the inverting amplifier 31 is increased in proportion to the gain $-G$ so that the S/N of the signal output obtained from the output terminal 36 of the charge detection circuit 35 is deteriorated.

Figure 18:
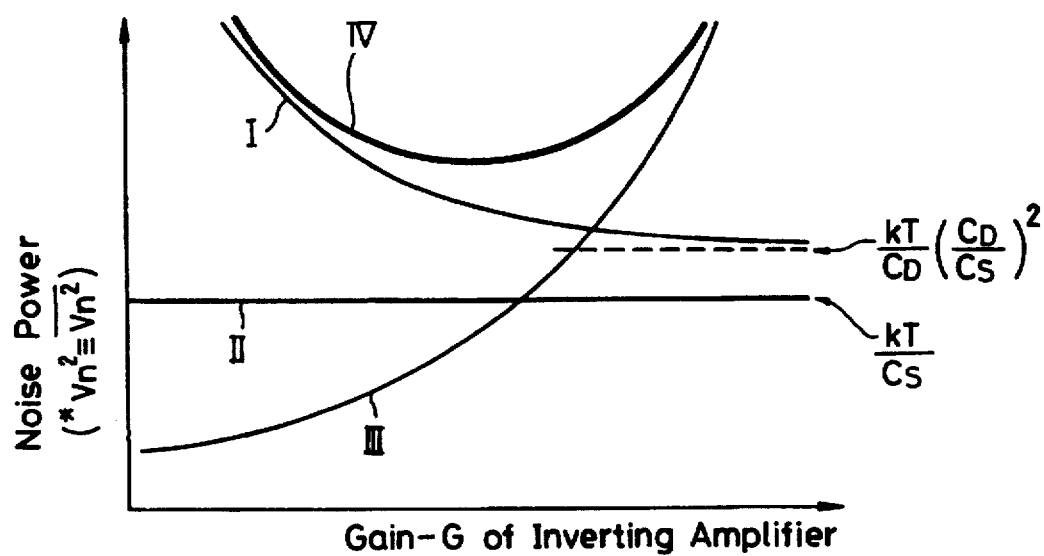
FIG. 18 is a graph schematically showing a sum total $\bigstar V_n^2$ of random noises output to an output terminal of the charge detection circuit according to the present invention.

FIG. 18 is a graph schematically showing the noise $*V_n^2$ expressed by the equation (6). In FIG. 18, a curve I shows a noise generated in the detection capacitor element 32, a straight line II shows a noise generated in the load capacitor element 24, a curve III shows a noise generated in the inverting amplifier 31, and a curve IV shows a sum total noise of the above-mentioned noises. In FIG. 18, a horizontal axis indicates the gain $-G$ of the inverting amplifier 31 and a vertical axis indicates a noise power $*V_n^2$.

As is clear from the graph of FIG. 18, although the kTC noise of the detection capacitor element 32 is ostensibly decreased with the increase of the gain $-G$ of the inverting amplifier 31, the noise of the inverting amplifier 31 is increased.

Therefore, according to the embodiment of the present invention, in the amplifying type solid-state imaging device 37 shown in FIG. 4, it is possible to maximize the S/N of the signal output obtained from the output terminal 36 of the charge detection circuit 35 by optimizing the gain $-G$ of the inverting amplifier 31 used in the charge detection circuit 35.

With respect to the load capacitor end converted random noises generated from the load capacitor element 24 of the pixel MOS transistor 1, the detection capacitor element 32 of the charge detection circuit 35 and the inverting amplifier 31 used in the charge detection circuit 35, the gain $-G$ of the inverting amplifier 31 is set to be maximum to the extent that the random noise generated from the inverting amplifier 31 used in the charge detection circuit 35 may not exceed 10 times a larger kTC noise of kTC noises generated from the load capacitor element 24 or the detection capacitor element 32. This condition is approximately expressed as:

$$10 \times \frac{kT}{C_S} \text{ or } 10 \times \frac{1}{A^2} \cdot \frac{kT}{C_D} \geq \frac{G^2}{A^2} 4kT \int_{FL}^{BW} R_{eq} df \qquad (7)$$

More preferably, the gain $-G$ of the inverting amplifier 31 should be maximized such that the random noise generated from the inverting amplifier 31 may not exceed the kTC noise generated from the load capacitor element 24 or the detection capacitor element 32. This condition is approximately expressed as:

$$\frac{kT}{C_S} \text{ or } \frac{1}{A^2} \cdot \frac{kT}{C_D} \geq \frac{G^2}{A^2} 4kT \int_{FL}^{BW} R_{eq} df \qquad (8)$$

As described above, by maximizing the gain $-G$ of the inverting amplifier 31 such that the condition on the equation (7), more preferably, the equation (8) is satisfied, it is possible to maximize the S/N of the signal output obtained from the output terminal 36 of the charge detection circuit 35.

There are several methods for controlling the gain of the inverting amplifier 31. According to the following method, it is possible to control the gain of the inverting amplifier 31 without modifying the circuit configuration.

Figure 19:
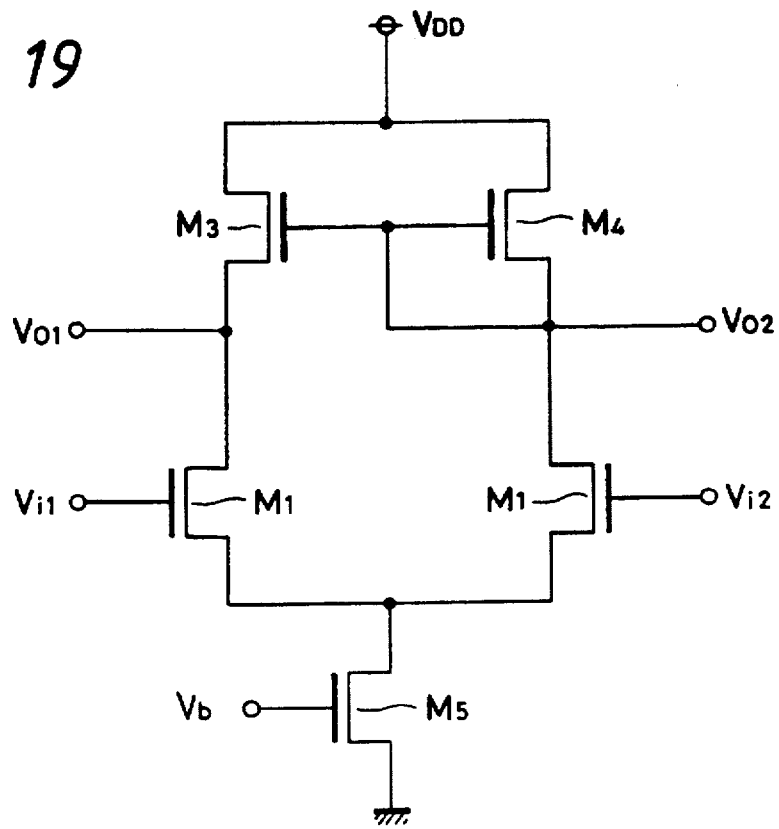
FIG. 19 is a schematic diagram showing an equivalent circuit of a differential amplifier described as an example of an inverting amplifier.

The amplifying type solid-state imaging device fundamentally composed of MOS transistors uses a differential amplifier shown in FIG. 19 as the inverting amplifier 31.

As shown in FIG. 19, this differential amplifier is composed of two MOS transistors $M_1$, $M_2$ whose sources are connected together, an MOS transistor $M_5$ serving as a constant current source and which is connected to the sources of the MOS transistors $M_1$, $M_2$ and which is grounded and load MOS transistors $M_3$, $M_4$ connected to the drains of the MOS transistors $M_1$, $M_2$. The drains of the MOS transistors $M_3$, $M_4$ are connected commonly to which a power supply voltage $V_{DD}$ is supplied. Input voltages $V_{i1}$, $V_{i2}$ are supplied to the gates of the MOS transistors $M_1$, $M_2$ and output voltages $V_{O1}$, $V_{O2}$ are generated from the MOS transistors $M_1$, $M_2$ at their drains to which the load MOS transistors $M_3$, $M_4$ are connected. A differential gain of this differential amplifier is given by the following equation (9):

$$V_{O1} - V_{O2} = -\frac{gm}{g_{dL}} \cdot \frac{1}{1 + \frac{kL}{(2 + 2K + L)M}} (V_{i1} - V_{i2}) \quad (9)$$

where $K = \frac{gd}{gm}$, $L = \frac{gds}{gm}$, $M = \frac{g_{dL}}{gm}$

In the above equation (9), gd is the drain conductance of the MOS transistors $M_1$, $M_2$ and $gd_s$ is the drain conductance of the MOS transistor $M_5$.

The differential gain of this differential amplifier is determined by a ratio between the mutual conductance gm of the differential pair MOS transistors $M_1$, $M_2$ and a drain conductance $g_{dL}$ of the MOS transistors $M_3$, $M_4$ which are the loads of the MOS transistors $M_1$, $M_2$.

Specifically, with respect to I–V (current-voltage) characteristics of the MOS transistor used in the differential amplifier, the drain conductance, in particular, $g_{dL}$ is changed by varying a short-channel effect of the saturation region by changing a channel length L of the short channel width of the saturation region. Therefore, it is possible to control the inverting gain to some extent without modifying a circuit configuration. Thus, it is possible to maximize the gain –G such that the random noise from the inverting amplifier 31 may not exceed 10 times the random noise from the load capacitor element 24 or the detection capacitor element 32, i.e., kTC noise.

In order to control the gain of the inverting amplifier 31, there are of course other methods such as a cascade connection of differential amplifiers or the like. According to the above-mentioned method, the gain of the inverting amplifier can be maximized such that the noise from the inverting amplifier may not exceed 10 times the kTC noise from the load capacitor element 24 or the detection capacitor element 32.

Figure 20:
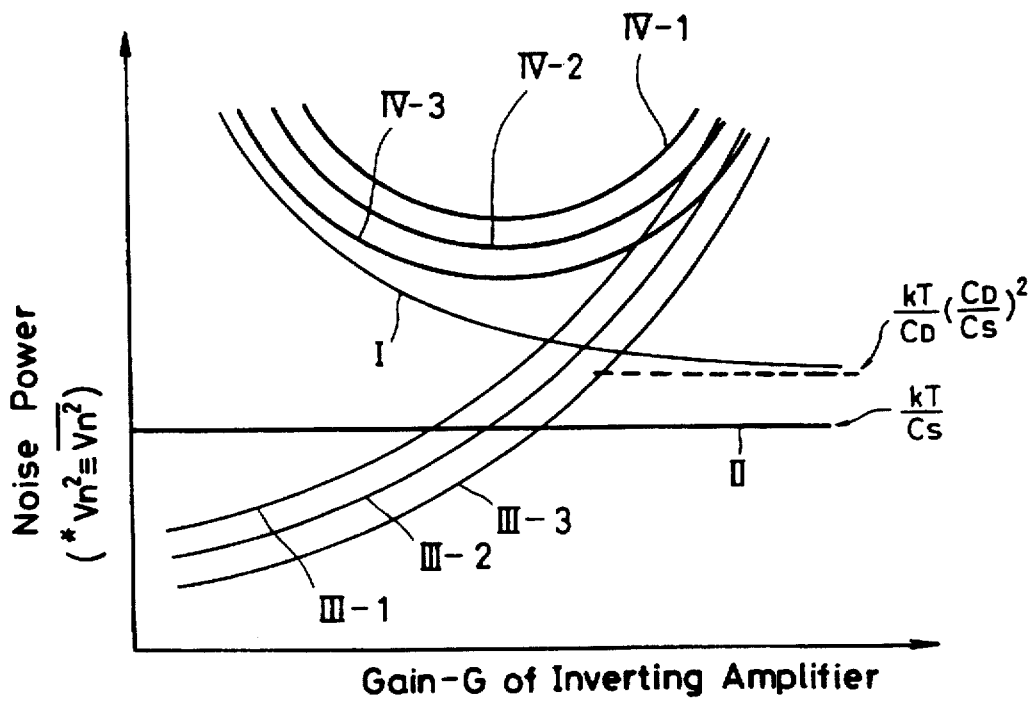
FIG. 20 is a graph used to explain the present invention.

When a noise curve III of the inverting amplifier 31, i.e., differential amplifier is shifted downwards as shown in FIG. 20 (see curves III-1, III-2 and III-3), the gate width W of the MOS transistor $M_1$ of the differential amplifier is increased as the noise curve III is shifted from the curve III-1 to the curve III-3. As a result, a power consumption tends to be increased. In FIG. 20, curves IV-1, IV-2, IV-3 show sum total noises corresponding to the noise curves III-1, III-2, III-3 of the differential amplifier 31, respectively.

Accordingly, when it is intended to reduce a power consumption, the gain of the differential amplifier is set to be small.

The arrangement in which the SN ratio can be maximized by sufficiently increasing the gain –G of the inverting amplifier 31 to the extent such that the random noise generated from the inverting amplifier 31 such as the differential amplifier forming a part of the charge detection circuit 35 may not exceed the kTC noise generated from the load capacitor element 24 or the detection capacitor element 32 of the charge detection circuit or 10 times the kTC noise can also be applied to the solid-state imaging device according to a second embodiment which will be described below.

An amplifying type solid-state imaging device of a capacitor load operation system capable of reading pixels of two rows in the mixed state which corresponds to the interlace scanning, i.e., so-called field read out according to the second embodiment of the present invention will be described below.

Figure 21:
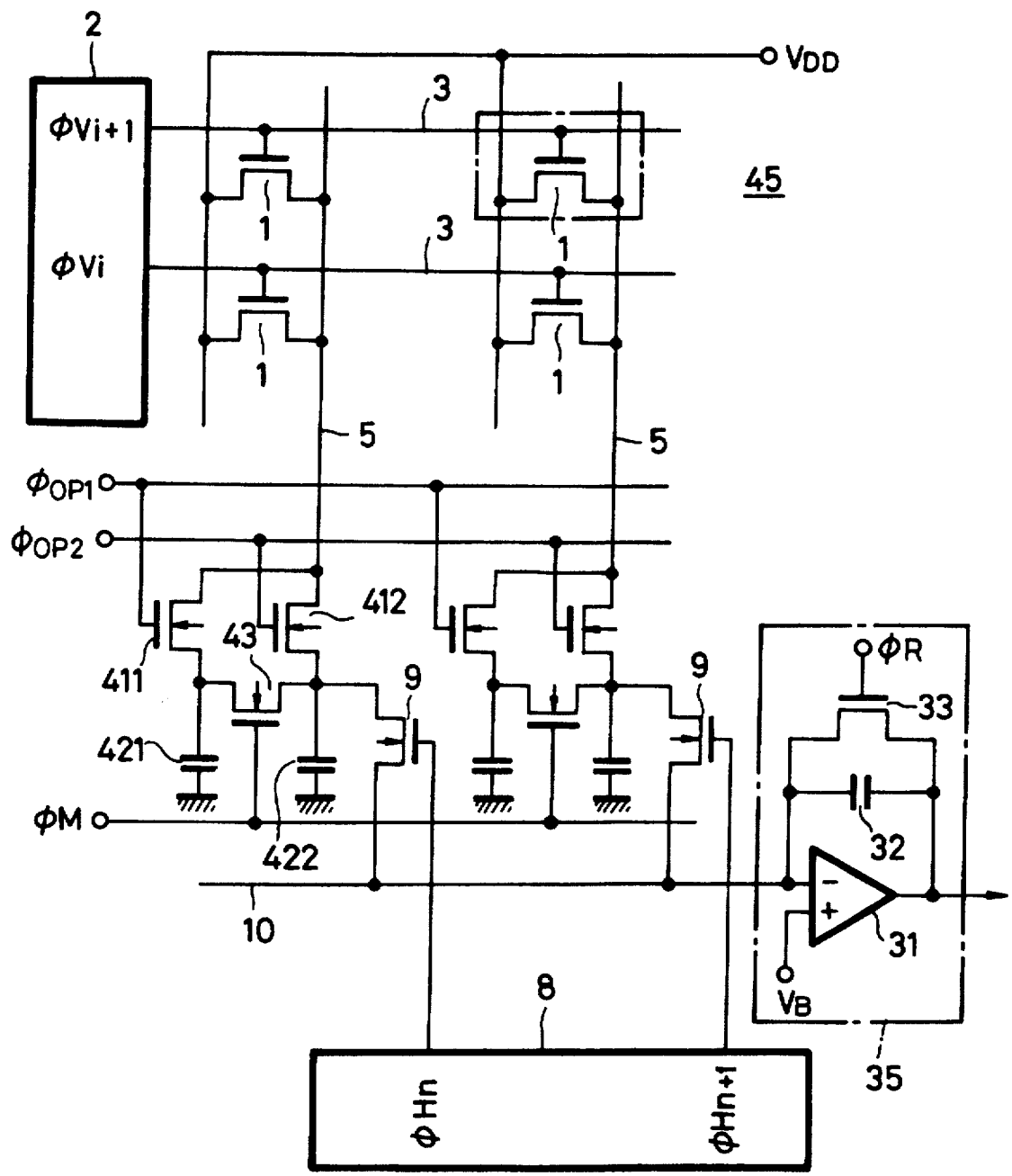
FIG. 21 is a schematic diagram showing an amplifying type solid-state imaging device according to a second embodiment of the present invention.

FIG. 21 shows an example of a field read out amplifying type solid-state imaging device according to the present invention.

In FIG. 21, reference numeral 1 depicts a light receiving element constructing a unit pixel (cell), e.g., pixel transistor, i.e., pixel MOS transistor according to this embodiment. There are provided a plurality of pixel MOS transistors 1 which are arrayed in a matrix fashion. Reference numeral 2 depicts a vertical scanning circuit composed of a shift register or the like. Reference numeral 3 depicts a vertical scanning line connected to the gate of the pixel MOS transistor 1 of every row. The vertical scanning lines 3 are connected to the vertical scanning circuit 2 and vertical scanning signals, i.e., vertical scanning pulses $\phi V$ ($\phi V_1$, . . ., $\phi V_i$, $\phi V_{n+1}$, . . . ) are sequentially supplied to the vertical scanning lines 3. The source of the pixel MOS transistor 1 is connected to the vertical signal line 5 of every column and the drain thereof is connected to a power supply $V_{DD}$.

In FIG. 21, reference numeral 8 depicts a horizontal scanning circuit formed of a shift register or the like. This horizontal scanning circuit 8 sequentially supplies the horizontal scanning signals, i.e., horizontal scanning pulses $\phi H$ ($\phi H_1$, . . . $\phi H_n$, $\phi H_{n+1}$, . . . ) to the gates of the horizontal MOS switches 9 connected to the horizontal signal lines 5 which will be described later on.

A first load capacitor element 421 is connected through a first operation MOS switch 411 to each vertical signal line 5. A second load capacitor element 422 is connected through a second operation MOS switch 412 in parallel to the first operation MOS switch 411. The other ends of the first and second load capacitor elements 421, 422 are held at a predetermined potential, i.e., ground potential in this embodiment. A first operation pulse $\phi_{OP1}$ is applied to the gate of the corresponding first operation MOS switch 411 and a second operation pulse $\phi_{OP2}$ is applied to the gate of the corresponding second operation MOS switch 412.

A mixing MOS switch 43 is connected between a junction of the first load capacitor element 421 and the first operation MOS switch 411 and a junction of the second load capacitor element 422 and the second operation MOS switch 412. A junction between the second load capacitor element 422 and the second operation MOS switch 412 is connected through the horizontal MOS switch 9 to the horizontal signal line 10.

A mixing operation pulse $\phi_M$ is applied to the gate of the mixing MOS switch 43.

To the output end of the horizontal signal line 10 is connected a charge detection circuit 35 which includes an inverting amplifier, e.g., an operational amplifier 31 using a differential amplifier or the like, a detection capacitor element 32 and a reset switch 33 which are similar to those described hereinbefore.

Specifically, the horizontal signal line 10 is connected to the inverting input terminal of the operational amplifier 31 of the charge detection circuit 35. A predetermined bias voltage $V_B$ is applied to the non-inverting input terminal of the operational amplifier 31. This bias voltage $V_B$ is used to determine the potential of the horizontal signal line 10.

The detection capacitor element 32 is connected in parallel to the operational amplifier 31, i.e., the detection capacitor element 32 is connected between the inverting input terminal and the output terminal of the operational amplifier 31. A reset switch 33 for resetting the horizontal signal line 10 and the detection capacitor element 32 is connected in parallel to the detection capacitor element 32.

While the reset switch 33 is composed of the n-channel MOS transistor as described above, the present invention is not limited thereto and the reset switch 33 may be composed of the p-channel MOS transistor 33p and the n-channel MOS transistor 33n which are connected in parallel to each other as earlier noted.

Figure 22:
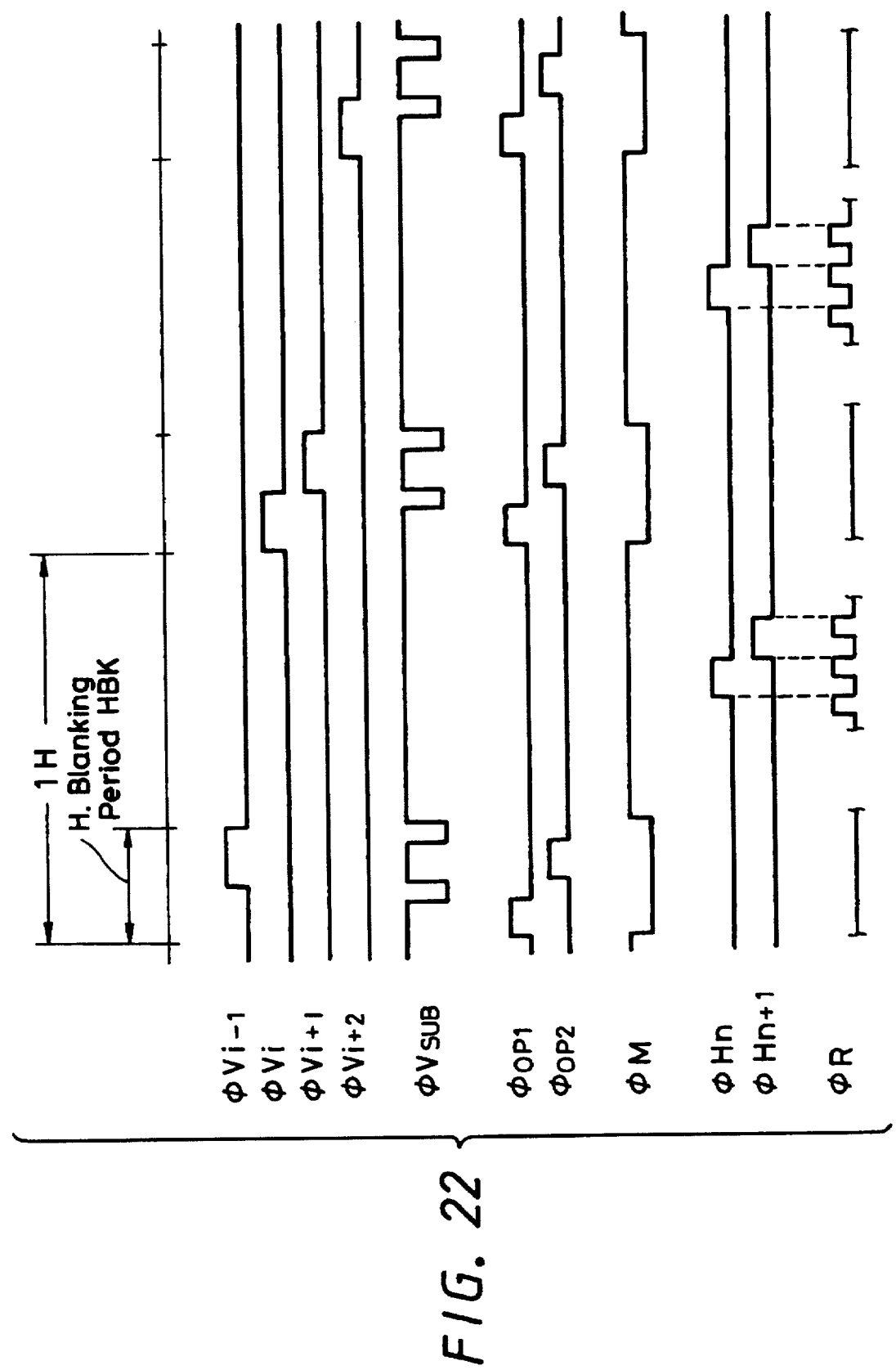
FIG. 22 is a timing chart used to explain operation of the amplifying type solid-state imaging device shown in FIG. 21.

FIG. 22 is a timing chart used to explain a timing at which this amplifying type solid-state imaging device 45 is operated.

In this amplifying type solid-state imaging device 45, as shown in FIG. 22, when a vertical scanning pulse $\phi V_i$ applied to an ith scanning line 3, for example, goes to high level during the first half of the horizontal blanking period HBK, the pixel MOS transistor 1 of the ith row is selected and the first operation MOS switch 411 is turned on by the first operation pulse $\phi_{OP1}$ in synchronism therewith, whereby the pixel MOS transistor 1 of the ith row is energized. Then, when the first operation pulse $\phi_{OP1}$ goes to the low level to turn off the first operation MOS switch 411, a signal voltage (electric charge) corresponding to the amount of signal charges accumulated in the pixel MOS transistor 1 of the ith row is held in the first load capacitor element 421.

After the signal voltage had been held in the first load capacitor element 421, a reset voltage $\phi_{SUB}$ is applied to the substrate and signal charges (holes) accumulated in the p-type well region formed beneath the gate electrode of the pixel MOS transistor 1 are discharged to the substrate side, resetting the pixel MOS transistor 1 of the 1th row.

A pixel MOS transistor which has not been selected is not reset because a low-level potential is applied to the gate thereof.

When the vertical scanning pulse $\phi V_{i+1}$ applied to the scanning line 3 of the i+1th row goes to high level during the second half of the horizontal blanking period HBK, the pixel MOS transistor 1 of the i+1th row is selected and the second operation MOS switch 412 is turned on by the second operation pulse $\phi_{OP2}$ in synchronism therewith, the pixel MOS transistor 1 of the 1+1th row the being energized.

Then, when the second operation pulse $\phi_{OP2}$ goes to the low level to turn off the second operation MOS switch 412, a signal voltage (electric charge) corresponding to an amount of signal charges accumulated in the pixel MOS transistor of the i+1th row is held in the second load capacitor element 422.

After the signal charge is held in the second load capacitor element 422, the reset voltage $\phi V_{SUB}$ is applied to the substrate and the signal charges (holes) accumulated in the pixel MOS transistor 1 are discharged to the substrate side, resetting the pixel MOS transistor 1 of the i+1th row.

Then, the mixing operation pulse $\phi_M$ is applied to the gate of the mixing MOS switch 43 during the horizontal scanning period, whereby the mixing MOS switch 43 is turned on to mix the signal charges of the pixels of the ith row and the i+1th row held in the first and second load capacitor elements 421, 422, i.e., signal charges of the pixel MOS transistors 1 of the adjacent two rows in the vertical direction being mixed.

The mixing MOS switch 43 sequentially turns on the horizontal MOS transistors 9 by the horizontal scanning pulses $\phi H$ ($\phi H_1, \ldots \phi H_n, \phi H_{n+1}, \ldots$) supplied thereto from the horizontal scanning circuit 8 while it is held in its on-state during one horizontal scanning period, thereby sequentially outputting mixed signal charges to the horizontal signal line 10. Then the charge detection circuit 35 connected to the output end of the horizontal signal line 10 demodulates a mixed signal charge of the two pixels to provide a signal voltage similarly as described hereinbefore.

The mixed and demodulated signal voltage of the detection capacitor element 32 is reset when the reset switch 33 is turned on by the reset pulse $\phi_R$.

According to the amplifying type solid-state imaging device 45, signal charges of the pixel MOS. transistors 1 of the adjacent two pixels of the same column are respectively held in the first and second load capacitor elements 421 and 422 and the signal charges are added by the mixing MOS switch 43 and are then read out at the field unit, thereby making it possible to realize the interlace operation. Then, since the signal charges accumulated in the first and second load capacitor elements 421 and 422 are flow to the horizontal signal line 10, the signal output becomes twice and the S/N becomes satisfactory.

In the amplifying type solid-state imaging device shown in FIG. 21, the signal charge output to the horizontal signal line 10 through only the horizontal MOS switch 9 from the load capacitor element 422 and the signal charge output to the horizontal signal line 10 through a series circuit of the mixing MOS switch 43 and the horizontal MOS switch 9 from the load capacitor element 421 are different in loss of signal charge, i.e., the loss of the signal charge output through both of the mixing MOS switch 43 and the horizontal MOS switch 9 is large. There is then the risk that signal charges cannot be read accurately at the field unit.

Further, as shown in FIG. 21, the system having the load capacitor element 421 across the mixing MOS switch 43 and the system having the load capacitor element 422 are not symmetrical from a circuit arrangement standpoint, i.e., the system having the load capacitor element 422 includes the horizontal MOS switch 9. As a result, a wiring capacitance, a drain-well capacitance and a drain-gate capacitance of the horizontal MOS switch 9 become an added capacitance of the load capacitor element 422. Therefore, even though the load capacitor elements 421, 422 are set to the same capacitance, the apparent capacitances of the two load capacitor elements 421, 422 become unequal and signal charges cannot be mixed accurately.

Figure 23:
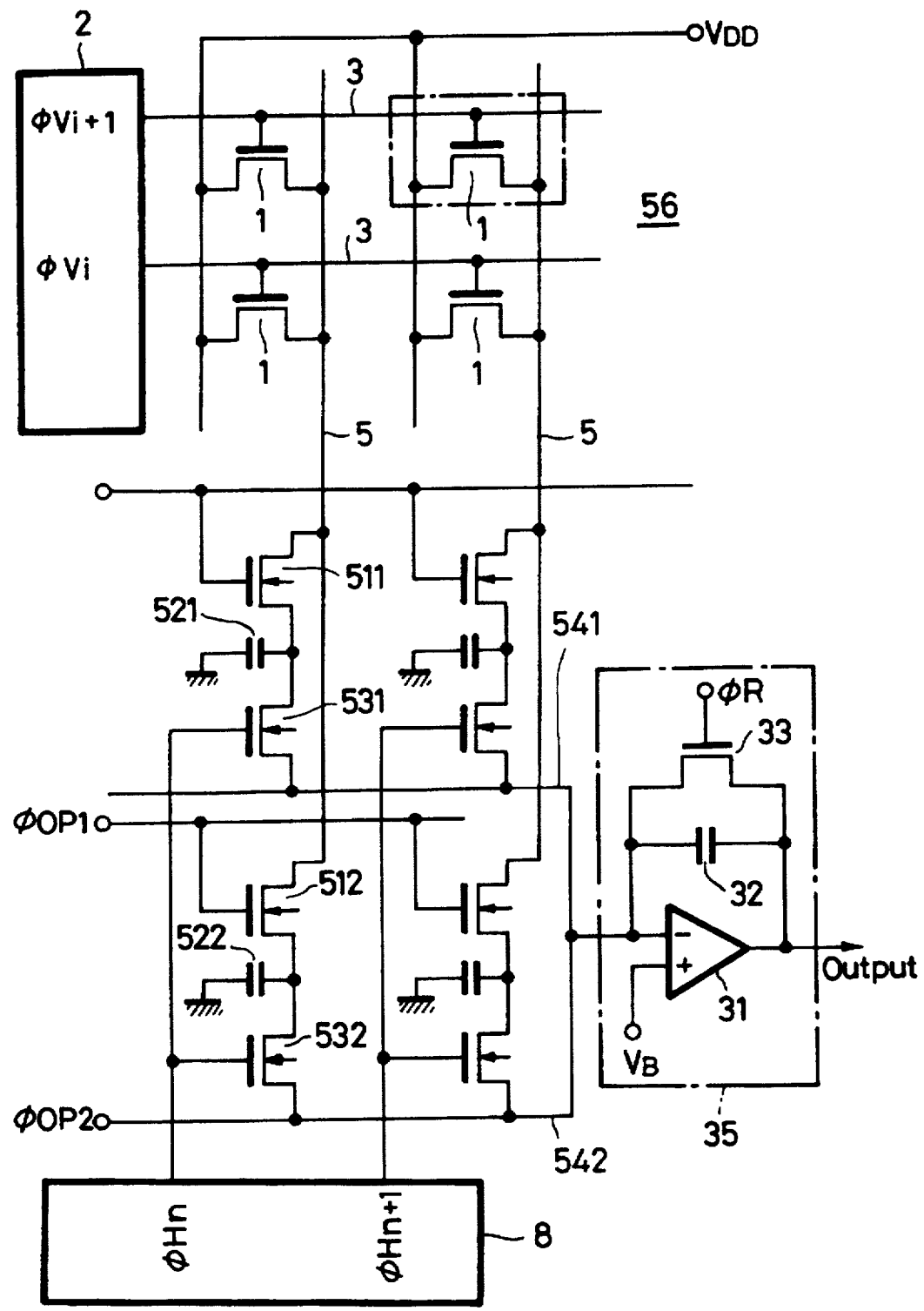
FIG. 23 is a schematic diagram showing an amplifying type solid-state imaging device according to a third embodiment of the present invention.

FIG. 23 shows a field read out system amplifying type solid-state imaging device according to a third embodiment of the present invention.

In FIG. 23, reference numeral 1 depicts a light receiving element which forms a unit pixel (cell), e.g., a pixel transistor, i.e., a pixel MOS transistor in this embodiment. A plurality of pixel MOS transistors 1 are arrayed in a matrix fashion. Reference numeral 2 depicts a vertical scanning circuit composed of a shift register or the like. Reference numeral 3 depicts a vertical scanning line connected to the gate of the pixel MOS transistor 1 of every row to which vertical scanning signals, i.e., vertical scanning pulses $\phi V$ ($\phi V_1, \ldots \phi V_i, \phi V_{i+1}, \ldots$) are sequentially applied. The source of the pixel MOS transistor 1 is connected to the vertical signal line 5 of each column and the drain thereof is connected to a power supply $V_{DD}$.

In FIG. 23, reference numeral 8 depicts a horizontal scanning circuit composed of a shift register or the like. This horizontal scanning circuit 8 is sequentially supplied with horizontal scanning signals, i.e., horizontal scanning pulses $\phi H$ ($\phi H_1, \ldots \phi H_n, \phi H_{n+1}, \ldots$) from the gate of the horizontal MOS switch connected to the horizontal signal line which will be described later on.

A first load capacitor element 521 is connected through a first operation MOS switch 511 to each vertical signal line 5 and a junction therebetween is connected through a first horizontal MOS switch 531 to a first horizontal signal line 541. A second load capacitor element 522 is connected to each vertical signal line 5 through a second operation MOS switch 512 in parallel to the above-mentioned connection circuit and a junction therebetween is connected through a second horizontal MOS switch 532 to a second horizontal signal line 542.

A first operation pulse $\phi_{OP1}$ is applied to the gate of the first operation MOS switch 511 and a second operation pulse $\phi_{OP2}$ is applied to the second MOS switch 512, respectively.

The gates of the first and second horizontal MOS switches 531 and 532 are connected commonly and are then connected to the horizontal scanning circuit 8.

The first and second horizontal MOS switches 541, 542 are commonly are connected at their output ends and connected to a charge detection circuit 35 composed of an operational amplifier 31 using a differential amplifier, a detection capacitor element 32 and a reset switch 33 similarly as described hereinbefore.

Specifically, a junction between the horizontal signal lines 541 and 542 is connected to an inverting input terminal of the operational amplifier 31 and a predetermined bias voltage $V_B$ is applied to a non-inverting input terminal of the operational amplifier 31. A potential of the horizontal signal line 10 is determined based on the bias voltage $V_B$.

The detection capacitor element 32 is connected in parallel to the operational amplifier 31, i.e., the detection capacitor element 32 is connected between the inverting input terminal and the output terminal of the operational amplifier 31. The reset switch 33 which resets the horizontal signal lines 541, 542 and the detection capacitor element 32 is connected in parallel to the detection capacitor element 32.

While the reset switch 33 is composed of the n-channel MOS transistor as described above, the present invention is not limited thereto and the reset switch 33 may be composed of a p-channel MOS transistor 33p and an n-channel MOS transistor 33n which are connected in parallel to each other.

Figure 24:
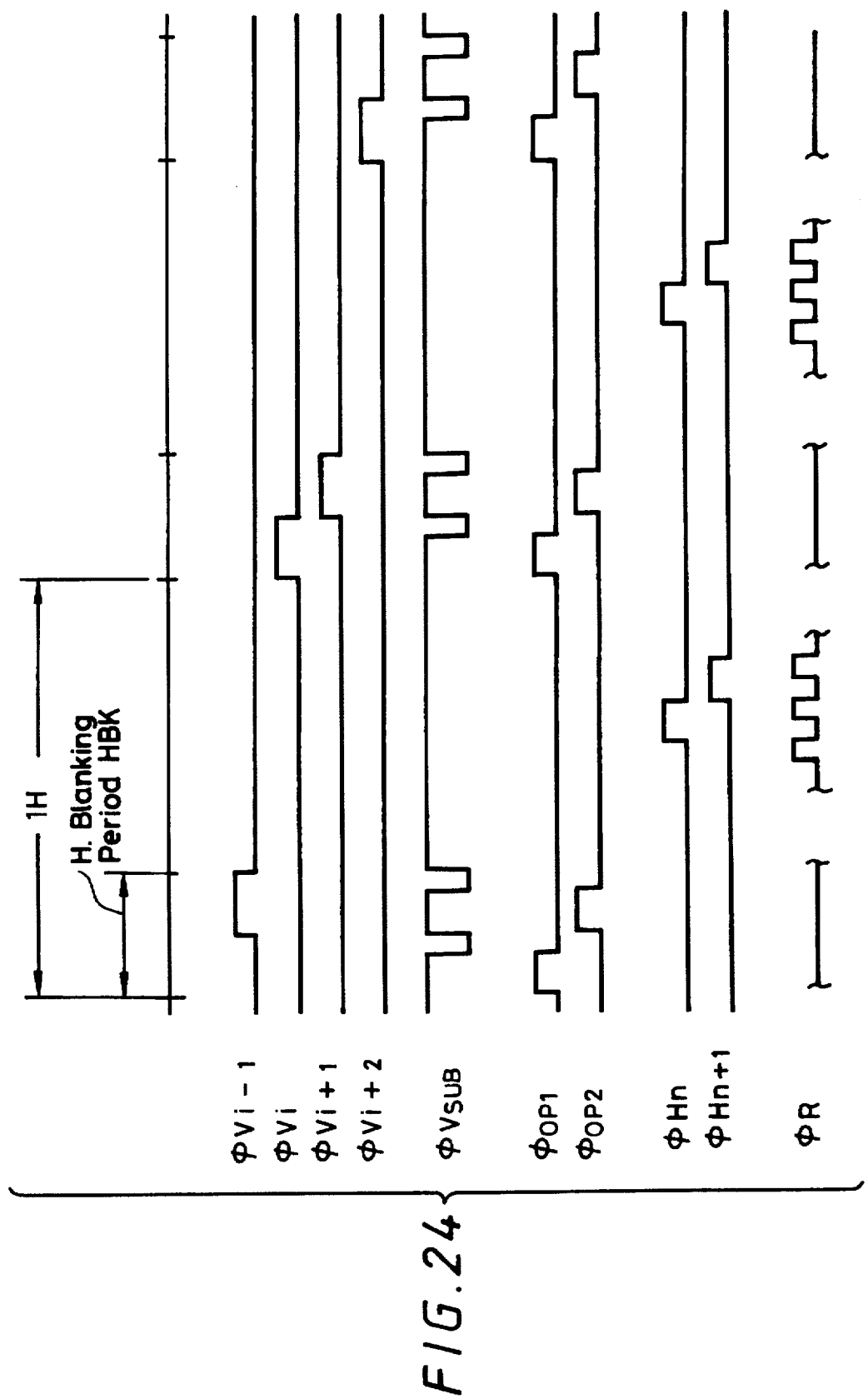
FIG. 24 is a timing chart used to explain operation of the amplifying type solid-state imaging device shown in FIG. 23.

FIG. 24 is a timing chart showing a timing at which the amplifying type solid-state imaging device 56 is operated.

In the amplifying type solid-state imaging device 56 as shown in FIG. 24, when the vertical scanning pulse $\phi V_1$ supplied to the scanning line 3 of the ith row, for example, goes to the high level during the first half period of the horizontal blanking period HBK, the pixel MOS transistor 1 of the ith row is selected and the first operation MOS switch 511 is turned on by the first operation pulse $\phi_{OP1}$ in synchronism therewith, whereby the pixel MOS transistor 1 of the ith row is energized. Then, when the first operation pulse $\phi_{OP1}$ goes to the low level to turn off the first operation MOS switch 511, a signal voltage (electric charge) corresponding to an amount of signal charges accumulated in the pixel MOS transistor 1 of the ith row is held in the first load capacitor element 521.

After the signal voltage had been held in the first load capacitor element 521, the reset voltage $\phi V_{SUB}$ is applied to the substrate and the signal charges (holes) accumulated in the p-type well region formed beneath the gate electrode of the pixel MOS transistor 1 are discharged to the substrate side, resetting the pixel MOS transistor 1 of the ith row.

A pixel MOS transistor that has not been selected is not reset because a low-level potential is applied to the gate thereof.

Subsequently, when the vertical scanning pulse $\phi V_{i+1}$ supplied to the scanning line 3 of the i+1th row goes to the high level during the second half of the horizontal blanking period HBK, the pixel MOS transistor 1 of the i+1th row is selected and the second operation MOS switch 512 is turned on by the first operation pulse $\phi_{OP1}$ in synchronism therewith, whereby the pixel MOS transistor 1 of the i+1th row is energized.

Then, when the second operation pulse $\phi_{OP2}$ goes to the low level to turn off the second operation MOS switch 512, a signal voltage (electric charge) corresponding to an amount of signal charges accumulated in the pixel MOS transistor 1 of the i+1th row is held in the second load capacitor element 522.

After the signal charges have been held in the second load capacitor element 522, the reset voltage $\phi V_{SUB}$ is applied to the substrate and signal charges (holes) accumulated in the pixel MOS transistor are discharged to the substrate side, resetting the pixel MOS transistor 1 of the i+1th row.

Then, when the horizontal scanning pulses $\phi H$ from the horizontal scanning circuit 8 are simultaneously applied to the first and second horizontal MOS switches 531 and 532 during one horizontal scanning period, the first and second horizontal MOS switches 531 and 532 are simultaneously turned on, whereby the signal voltages held in the first and second load capacitor elements 521, 522 are added by the first and second horizontal signal lines 541 and 542. The added signal is demodulated and is output by the charge detection circuit 35. With the horizontal scanning pulses from the horizontal scanning circuit 8, an output signal which results from mixing signals of corresponding pixel MOS transistors of two pixels in the vertical direction is read out from the amplifying type solid-state imaging device 56.

The added and demodulated signal voltage of the detection capacitor element 32 is reset when the reset switch 33 is turned on by the reset pulse $\phi_R$.

Figure 25:
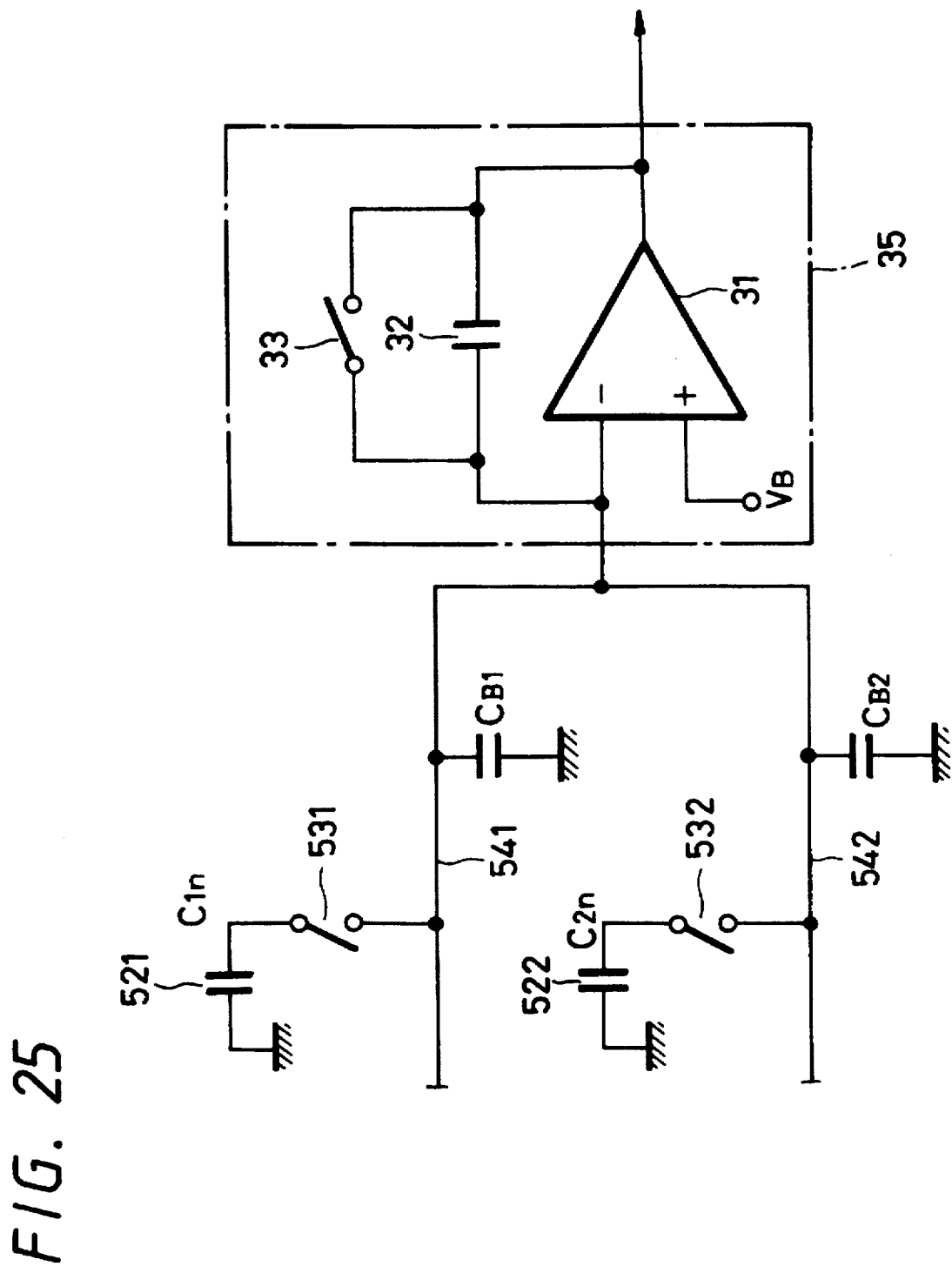
FIG. 25 is a schematic diagram of an equivalent circuit showing a main portion, i.e., an output circuit portion of the amplifying type solid-state imaging device shown in FIG. 23.

A principle with which the signal voltages held in the load capacitor elements 521, 522 are added and demodulated (read out at the field unit) by the charge detection circuit 35 will be described below with reference to an equivalent circuit diagram of FIG. 25.

Reference symbols $C_{1n}$, $C_{2n}$ assume capacitors of the load capacitor elements 521, 522 and reference symbols $V_{c1n}$, $V_{c2n}$ assume signal voltages held in the load capacitor elements 521, 522, respectively. Then, in the initial state, the condition that the first and second horizontal MOS switches 531, 532 are in the off-state and the first and second horizontal signal lines 541, 542 and the voltage across the detection capacitor element 32 of the charge detection circuit 35 are reset to the bias voltage $V_B$ by the reset switch 33. The reset switch 33 also is set in the off-state.

From this initial state, when the first and second horizontal MOS switches 531, 532 are simultaneously turned on and the signal charges held flow to the first and second signal lines 541, 542 to set the charge detection circuit 35 in the stationary state after a certain time (several nanoseconds to several 10s of nanoseconds), the potential of the horizontal signal lines 541, 542, i.e., the potential of the inverting input terminal of the operational amplifier 31 of the charge detection circuit 35 is changed by $\Delta V_{sig}$. Then, the following equation (10) is established:

$$\Delta Q_{c1n} = C_{1n}\{(V_B + \Delta V_{sig}) - V_{c1n}\} \quad (10)$$
$$\Delta Q_{c2n} = C_{2n}\{(V_B + \Delta V_{sig}) - V_{c2n}\}$$
$$\Delta Q_{CB1} = C_{B1}\Delta V_{sig}$$
$$\Delta Q_{CB2} = C_{B2}\Delta V_{sig}$$
$$\Delta Q_{CD} = C_D\{(\Delta V_{sig} - \Delta V_{out})\}$$
$$= \{(\Delta V_{sig} + G\Delta V_{sig})\}$$
$$\because V_{out} = -G\Delta_{sig}$$

In the above-mentioned equation (10), $\Delta Q_{c1n}$, $\Delta Q_{c2n}$, $\Delta Q_{CB1}$, $\Delta Q_{CB2}$ and $\Delta Q_{CD}$ are the charge amounts which result from changing the capacitances $C_{1n}$, $C_{2n}$ of the load capacitor elements 521, 522, the stray capacitances $C_{B1}$, $C_{B2}$ of the horizontal signal lines 541, 542 and the capacitance $C_D$ of the detection capacitor element 32 after the horizontal MOS switches 531, 531 were turned on.

Since the entire equivalent circuit preserves the charge amount, we have:

$$\Delta Q_{C1n} + \Delta Q_{C2n} + \Delta Q_{CB1} + \Delta Q_{CB2} + \Delta Q_{CD} = 0 \quad (11)$$

From a design standpoint, the respective capacitances are expressed as:

$$C_{1n} = C_{2n} = C_L$$
$$C_{B1} = C_{B2} = C_B \quad (12)$$

Thus, the signal voltage $\Delta V_{out}$ is expressed as:

$$\Delta V_{out} = -\frac{C_L\{(V_B - V_{C1n}) + (V_B - V_{C2n})\}}{C_D + \frac{1}{G}(C_n + 2C_L + 2C_B)} \quad (13)$$

Further, if the gain of the operational amplifier 31 is sufficiently large, then we have:

$$\Delta V_{out} = -\frac{C_L}{C_D}\{(V_B - V_{C1n}) + (V_B - V_{C2n})\} \quad (14)$$

As described above, the signal voltages $V_{C1n}$, $V_{C2n}$ held in the load capacitor elements 521, 522 are added to the detected capacitance $C_n$ are thereby demodulated, to thus make it possible to realize the field read out.

While the reading operation at the first field in the interlace scanning has been described so far, the present invention is not limited thereto and it is needless to say that a similar operation is carried out in the pixel MOS transistors corresponding to the scanning line shifted by one pixel, such as the scanning lines 3 of the i−1th and the ith rows.

According to the amplifying type solid-state imaging device 56, as shown in FIG. 23 the signal charges of the pixel MOS transistors 1 of the adjacent two pixels in the same column are respectively held in the first and second load capacitor elements 521, 522 and flow to the first and second horizontal signal lines 541, 542 which are simultaneously turned on. Then, the above two signal charges are added and are read out at the field unit, thereby making it possible to realize the interlace scanning operation. Therefore, the signal output becomes double and the S/N becomes satisfactory.

The circuit system in which the signal charge of the first load capacitor element 521 is output to the first horizontal signal line 541 and the circuit system in which the signal charge of the second load capacitor element 522 is output to the second horizontal signal line 542 are symmetrical to each other. Therefore, the losses of the signal charges output to the horizontal signal lines 541, 542 are equal. Thus, a gain difference obtained when the signal charges are added can be avoided and it is possible to carry out the accurate field read out operation.

Since the two circuit systems are symmetrical to each other as described above, the added amounts of the wiring capacitance, the drain-well capacitances and the drain-gate capacitances of the horizontal MOS switches become equal, and the ostensible capacitances of the two load capacitor elements 521, 522 become equal. Therefore, it is possible to mix the signal charges accurately.

Furthermore, as compared with the amplifying type solid-state imaging device 45 shown in FIG. 21, the mixing MOS switches can be removed and a mask layout required upon manufacturing can be simplified.

Figure 26:
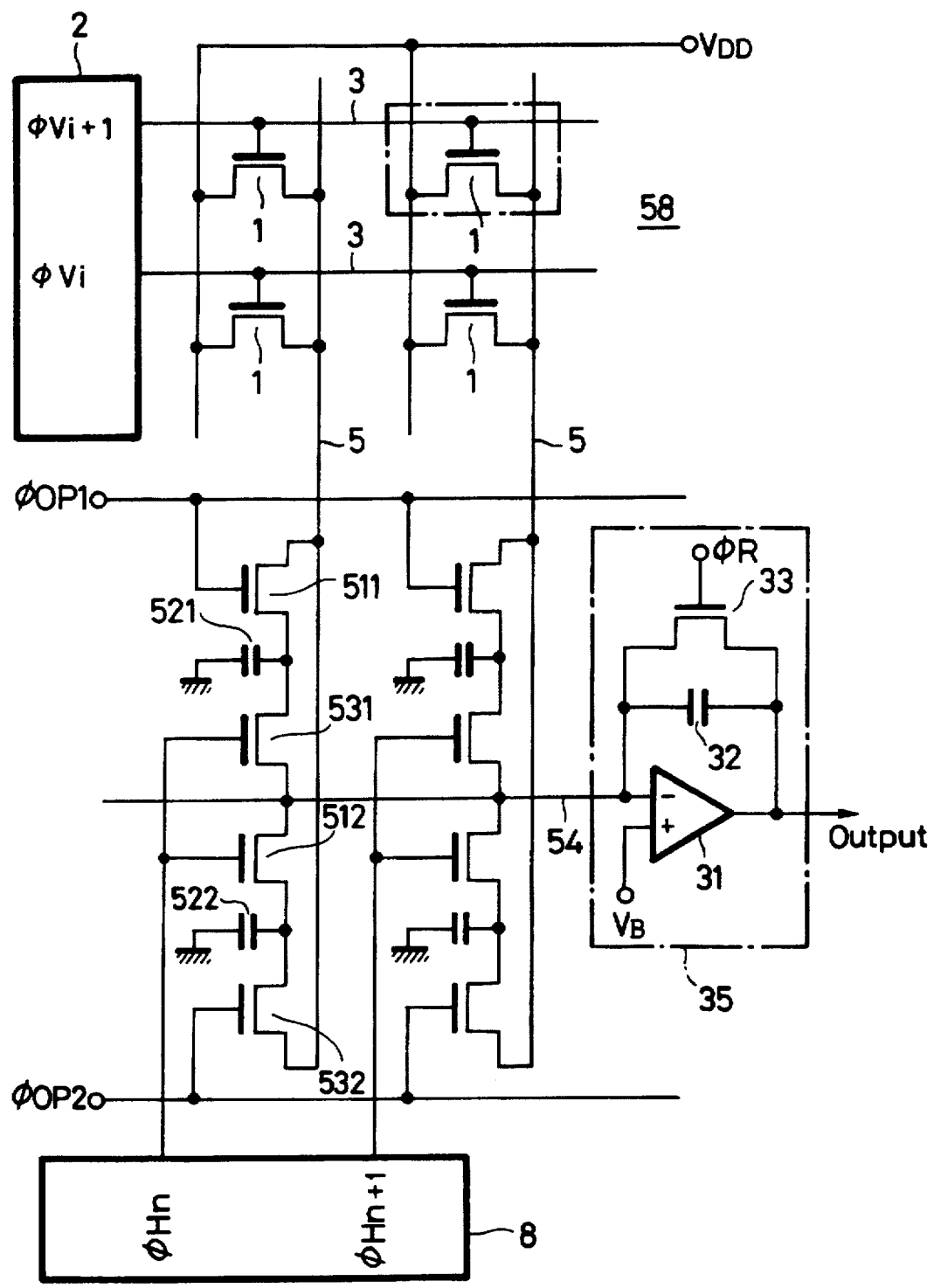
FIG. 26 is a circuit diagram showing a main portion, i.e., an output circuit portion of an amplifying type solid-state imaging device according to a fourth embodiment of the present invention.

FIG. 26 shows a field read out amplifying type solid-state imaging device according to a fourth embodiment of the present invention. In FIG. 26, elements and parts identical to those of FIG. 23 are marked with the same references and therefore need not be described in detail.

In FIG. 26, reference numeral 1 depicts the light receiving element constructing a unit pixel (cell), e.g., a pixel transistor, i.e., a pixel MOS transistor in this embodiment. There are arrayed a plurality of pixel MOS transistors 1 in a matrix fashion. Reference numeral 2 depicts the vertical scanning circuit composed of the shift register or the like. Reference numeral 3 depicts the vertical scanning line connected to the gates of the pixel MOS transistors 1 of every row and to which the vertical scanning signals, i.e., vertical scanning pulses $\phi V$ ($\phi V_1, \ldots \phi V_i, \phi V_{i+1}, \ldots$) are sequentially supplied. The source of the pixel MOS transistor 1 is connected to the vertical signal line 5 of every column and the drain thereof is connected to the power supply $V_{DD}$.

Reference numeral 8 depicts the horizontal scanning circuit composed of the shift register or the like. The horizontal scanning circuit 8 sequentially supplies the horizontal scanning signals, i.e., horizontal scanning pulses $\phi H$ ($\phi H_1, \ldots \phi H_n, \phi H_{n+1}, \ldots$) to the gates of horizontal MOS switches connected to the horizontal signal line which will be described later on.

The first load capacitor element 521 is connected through the first operation MOS switch 511 to each vertical signal line 5 and a junction therebetween is connected through the first horizontal MOS switch 531 to a horizontal signal line 54. The second load capacitor element 522 is connected in parallel to the above connection circuit through the second operation MOS switch 512 and a junction therebetween is connected through the second horizontal MOS switch 532 to the above horizontal signal line 54.

Specifically, according to this embodiment, there is provided the single horizontal line 54. The connection circuit composed of the first operation MOS switch 511, the first load capacitor element 521 and the first horizontal MOS switch 531 and the connection circuit composed of the second operation switch MOS switch 512, the second load capacitor element 522 and the second horizontal MOS switch 532 are disposed symmetrically with respect to the single horizontal signal line 54.

The first operation pulse $\phi_{OP1}$ is applied to the gate of the first operation MOS switch 511 and the second operation pulse $\phi_{OP2}$ is applied to the gate of the second operation MOS switch 512, respectively.

The gates of the first and second horizontal MOS switches 531, 532 are connected commonly and are then connected to the horizontal scanning circuit 8.

The output end of the horizontal signal line 54 is connected to the charge detection circuit 35 composed of an inverting amplifier, e.g., operational amplifier 31 using the differential amplifier, the detection capacitor element 32 and the reset switch 33 similarly as described hereinbefore.

Specifically, the horizontal signal line 54 is connected to the inverting input terminal of the operational amplifier 31 of the charge detection circuit 35. The predetermined bias voltage $V_B$ is applied to the non-inverting input terminal of the operational amplifier 31. The potential of the horizontal signal line 54 is determined based on the bias voltage $V_B$.

The detection capacitor element 32 is connected in parallel to the operational amplifier 31, i.e., the detection capacitor element 32 is connected between the inverting input terminal and the output terminal of the operational amplifier 31. The reset switch 33 for resetting the horizontal signal line 54 and the detection capacitor element 32 are connected in parallel to the detection capacitor element 32.

While the reset switch 33 is composed of the n-channel MOS transistor as described above, the present invention is not limited thereto and the reset switch 33 can be composed of the p-channel MOS transistor 33p and the n-channel MOS transistor 33n which are connected in parallel to each other.

Operation timing of the amplifying type solid-state imaging device 58 is similar to that of FIG. 24.

Operation of the amplifying type solid-state imaging device 58 is substantially similar to that of the amplifying type solid-state imaging device 56 shown in FIG. 23. While the amplifying type solid-state imaging device 56 outputs the signal voltage held in the first load capacitor element 521 and the signal voltage held in the second load capacitor element 522 to the first and second horizontal signal lines 541, 542 and then adds the signal voltages as described above, the amplifying type solid-state imaging device 58 according to this embodiment is different in that the signal voltages held in the first and second load capacitor elements 521 and 522 are output to the single horizontal signal line 54 in which they are added.

Therefore, according to the amplifying type solid-state imaging device 58 shown in FIG. 26, as compared with the amplifying type solid-state imaging device 56 shown in FIG. 23, the horizontal signal line 54 can be reduced by one. Therefore, it is possible to reduce the capacitance of the horizontal signal line, i.e., element that lowers the gain. The amplifying type solid-state imaging device 58 can achieve effects similar to those of the amplifying type solid-state imaging device 56 shown in FIG. 23.

Figure 27:
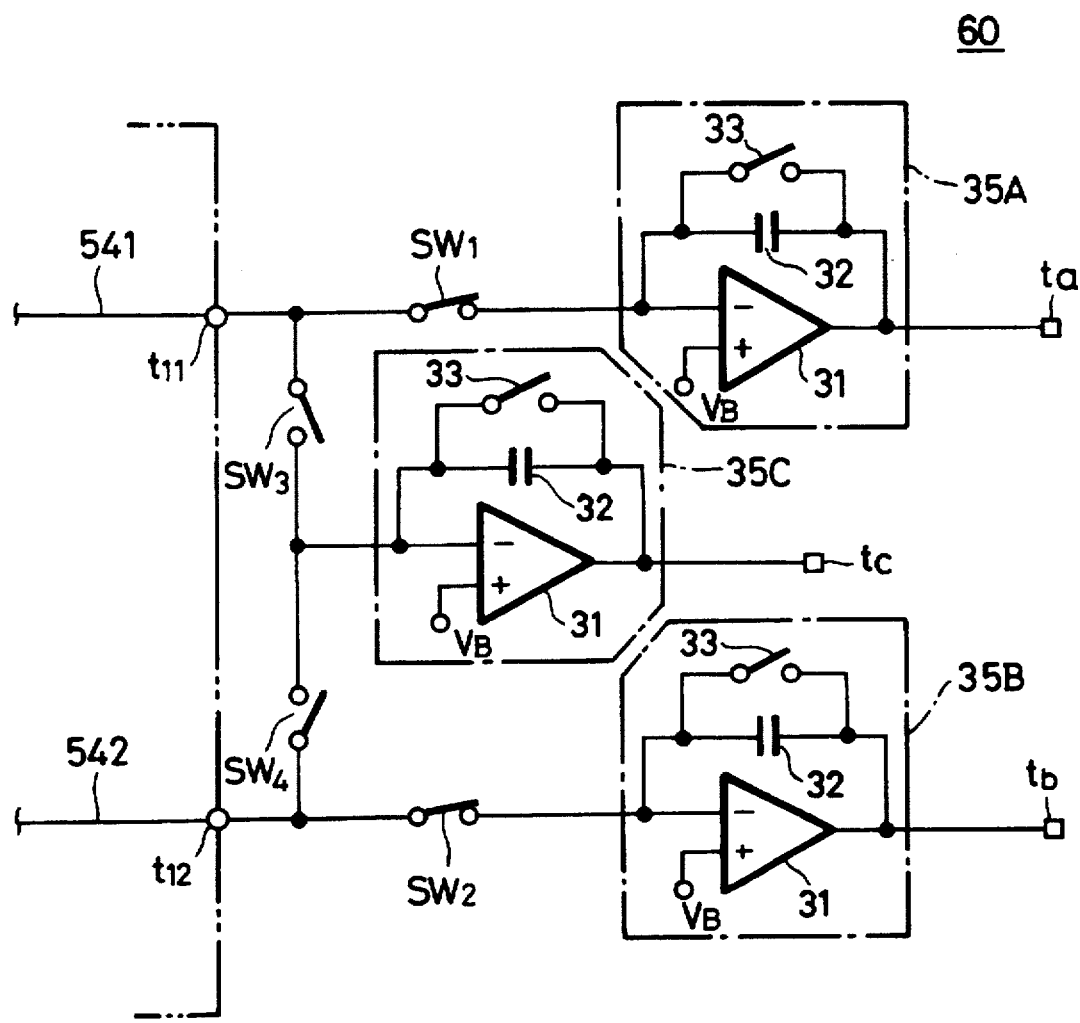
FIG. 27 is a circuit diagram showing a main portion, i.e., an output circuit portion of an amplifying type solid-state imaging device according to a fifth embodiment of the present invention.
Figure 28:
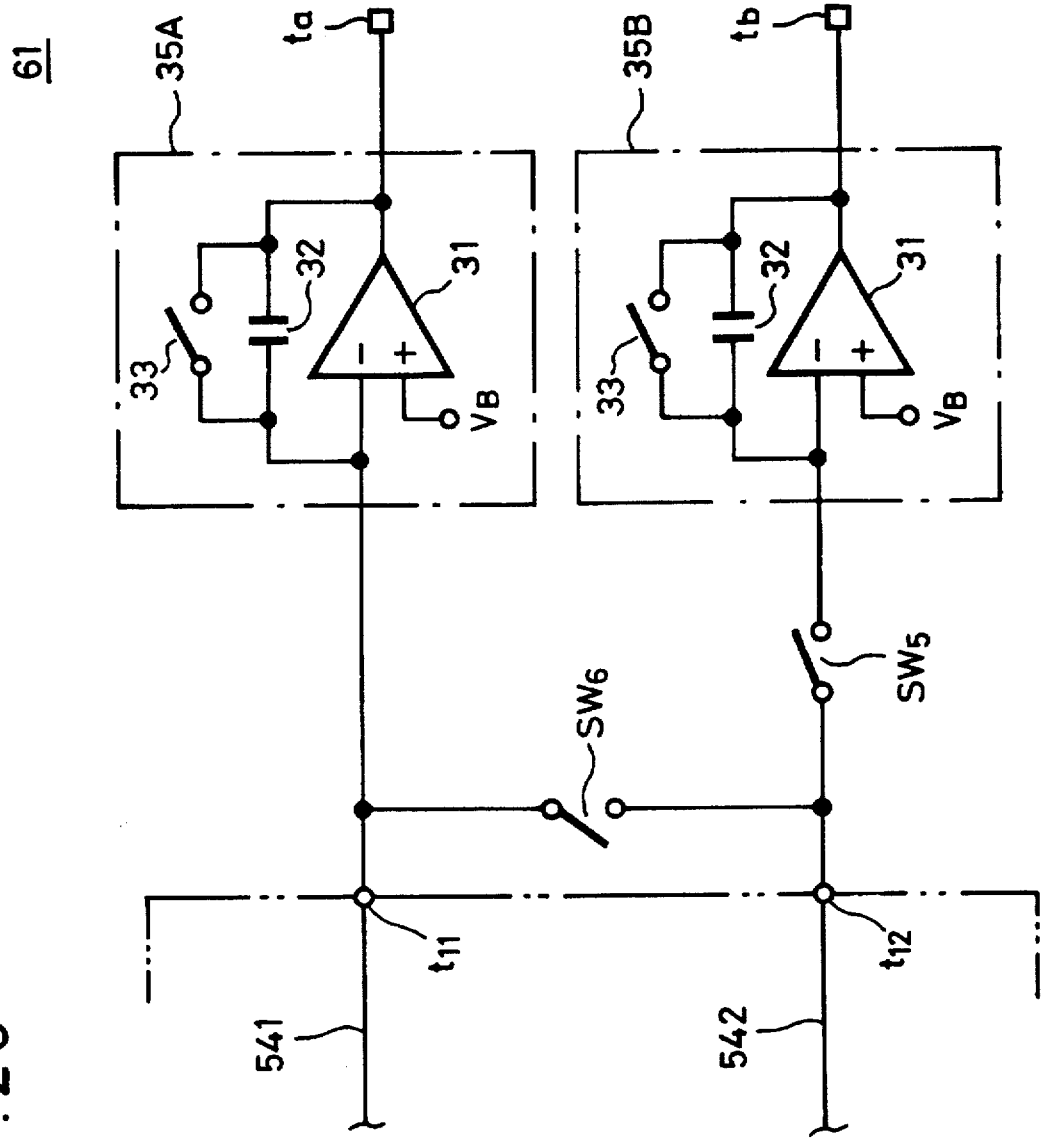
FIG. 28 is a circuit diagram showing a main portion, i.e., an output circuit portion of an amplifying type solid-state imaging device according to a sixth embodiment of the present invention.

FIGS. 27 and 28 show amplifying type solid-state imaging devices of capacitor load operation system according to fifth and sixth embodiments of the invention. The amplifying type solid-state imaging devices according to the fifth and sixth embodiments can selectively carry out the field read out and the all pixel read out.

FIGS. 27 and 28 show the amplifying type solid-state imaging devices which are applied to the arrangement shown in FIG. 23. FIGS. 27 and 28 illustrate only output circuits following output terminals $t_{11}$, $t_{12}$ of the first and second horizontal signal lines 541, 542. Arrangements and connection relationship of the pixel MOS transistor 1, the vertical scanning circuit 2, the horizontal scanning circuit 8, the first and second operation MOS switches 511, 512, the first and second load capacitor elements 521, 522, the first and second horizontal MOS switches 531, 532 and the first and second horizontal signal lines 541, 542 are similar to those of FIG. 23, though not shown, and therefore need not be described in detail.

In the fifth embodiment shown in FIG. 27, the output terminal $t_{11}$ of the first horizontal signal line 541 is connected through a first switch unit (e.g., switch unit composed of MOS transistor) $SW_1$ to a first charge detection circuit 35A, and an output terminal $t_{12}$ of the second horizontal signal line 542 is connected through a second switch means (e.g., switch unit composed of an MOS transistor) $SW_2$ to a second charge detection circuit 35B. Further, a junction between the output terminal $t_{11}$ and the first switch unit $SW_1$ and a junction between the output terminal $t_{12}$ and the second switch unit $SW_2$ are connected through a third switch unit (e.g., switch unit composed of MOS transistor) $SW_3$ and a fourth switch unit (e.g., switch unit composed of MOS transistor) $SW_4$ to a third charge detection circuit 35C.

Each of the first, second and third charge detection circuits 35A, 35B and 35C includes the operational amplifier 31 using the differential amplifier, the detection capacitor element 32 and the reset switch 33 similarly as described hereinbefore. The first horizontal signal line 541 is connected through the first switch unit $SW_1$ to the inverting input terminal of the operational amplifier 31 of the first charge detection circuit 35A. The second horizontal signal line 542 is connected through the switch unit $SW_2$ to the inverting input terminal of the operational amplifier 31 of the second charge detection circuit 35B. Further, the two horizontal signal lines 541, 542 are commonly connected through the third and fourth switch unit $SW_3$ and $SW_4$ and are then connected to the inverting input terminal of the operational amplifier 31 of the third charge detection circuit 35C.

In FIG. 27, reference symbols ta, tb and tc depict output terminals of the first, second and third charge detection circuits 35A, 35B and 35C, respectively.

In the amplifying type solid-state imaging device 60 shown in FIG. 27, as earlier noted with reference to FIG. 23, the signal voltage of adjacent two pixels in the column direction, i.e., the pixel MOS transistor 1 of the ith row is held in the first load capacitor element 521 and a signal voltage of the pixel MOS transistor 1 of the i+1th row is held in the second load capacitor element 522.

When the field read out is carried out, the first and second switch unit $SW_1$ and $SW_2$ are set in the off-state and the third and fourth switch unit $SW_3$ and $SW_4$ are set in the on-state. Then, when the first and second horizontal MOS switches 531, 532 are simultaneously turned on by the horizontal scanning pulses $\phi H$ ($\phi H_1, \ldots \phi H_n, \phi H_{n+1}, \ldots$) supplied thereto from the horizontal scanning circuit 8, the signal voltages output to the first and second horizontal signal lines 541, 542 from the first and second load capacitor elements 521, 522 are added and the added signal voltage is input to the third charge detection circuit 35C, in which it is demodulated and an output signal of mixed vertical two pixels is obtained, thereby the field read out being carried out.

When the all pixel read out (non-interlace scanning) is carried out, the first and second switch unit $SW_1$, $SW_2$ are set in the on-state and the third and fourth switch unit $SW_3$, $SW_4$ are set in the off-state. Then, the first and second horizontal MOS switches 531, 532 are simultaneously turned on by the horizontal scanning pulses $\phi H$ ($\phi H_1, \ldots \phi H_n, \phi H_{n+1}, \ldots$) supplied thereto from the horizontal scanning circuit 8.

Therefore, a signal voltage output to the first horizontal signal line 541 from the first load capacitor element 521 at its ith row is input to and demodulated by the first charge detection circuit 35A and an output signal corresponding to the pixel of the ith row is obtained from the output terminal ta. A signal charge output to the second horizontal signal line 542 from the second load capacitor element 522 at its portion corresponding to the pixel of the i+1th row is input to and demodulated by the second charge detection circuit 35B and an output signal corresponding to the pixel of the i+1th row is obtained from the output terminal tb, so that the all pixel read out is carried out.

In the sixth embodiment shown in FIG. 28, the output terminal $t_{11}$ of the first horizontal signal line 541 is connected to the first charge detection circuit 35A. The output terminal $t_{12}$ of the second horizontal signal line 542 is connected through a first switch unit (e.g., switch unit composed of an MOS transistor) $SW_5$ to the second charge detection circuit 35B. A second switch unit (e.g., switch unit composed of an MOS transistor) $SW_6$ ois connected between the output terminals $t_{11}$ and $t_{12}$ of the first and second horizontal signal lines 541, 542.

Each of the first and second charge detection circuits 35A and 35B is composed of the operational amplifier 31 using the differential amplifier, the detection capacitor element 32 and the reset switch 33 similarly as described hereinbefore.

In the amplifying type solid-state imaging device 61 shown in FIG. 28, as earlier noted with reference to FIG. 23, signal charges of adjacent two pixels in the column direction, e.g., the pixel MOS transistor 1 of the ith row are held in the first load capacitor element 521 and signal charges of the pixel MOS transistor of the i+1th row are held in the second load capacitor element 522.

When the field read out is carried out, the first switch unit $SW_5$ is turned off and the second switch unit $SW_6$ is turned on. Then, the first and second horizontal MOS switches 531, 532 are simultaneously turned on by the horizontal scanning pulses $\phi H$ ($\phi H_1, \ldots \phi H_n, \phi H_{n+1}, \ldots$) supplied thereto from the horizontal scanning circuit 8. Therefore, the signal charges output to the first and second horizontal signal lines 541, 542 from the first and second load capacitor elements 521, 522 are added and then input to the first charge detection circuit 35A, in which it is demodulated. Thus, an output signal, in which signal charges from vertically-adjacent two pixels are mixed, is output from the output terminal ta, so that the field read out is carried out.

When the all pixel read out is carried out, the first switch unit $SW_5$ is turned on and the second switch unit $SW_6$ is turned off. Then, the first and second horizontal MOS switches 531, 532 are simultaneously turned on by the horizontal scanning pulses $\phi H$ ($\phi H_1, \ldots \phi H_n, \phi H_{n+1}, \ldots$) supplied thereto from the horizontal scanning circuit 8. Thus, a signal charge output to the first horizontal signal line 541 from the first load capacitor element 521 at its portion corresponding to the pixel of the ith row, for example, is input to and demodulated by the first charge detection circuit 35A so that an output signal of the pixel of the ith row is obtained from the output terminal ta. A signal charge output to the second horizontal signal line 542 from the second load capacitor element 522 at its portion corresponding to the pixel of the i+1th row is input to and demodulated by the second charge detection circuit 35B, and an output signal of the pixel of the i+1th row is obtained from the output terminal tb, the all pixel read out being the carried out.

According to the amplifying type solid-state imaging devices 60 and 61 shown in FIGS. 27 and 28, the field read out and the all pixel read out can both be realized by controlling the switch units $SW_1$ to $SW_4$ and the switch units $SW_5$, $SW_6$. Also, according to the fifth and sixth embodiments shown in FIGS. 27 and 28, it is, of course, possible to achieve effects similar to those of the amplifying type solid-state imaging device 56 shown in FIG. 23.

In FIG. 27, if the switch units $SW_1$, $SW_2$ are removed, the first and second horizontal signal lines 541, 542 are directly connected to the first and second charge detection circuits 35A, 35B and the connection between the output terminals $t_{11}$ and $t_{12}$ is removed, i.e., the third charge detection circuit 35C and the third and fourth switch units $SW_3$, $SW_4$ are removed, then it is possible to construct the all pixel read out amplifying type solid-state imaging device.

Moreover, in FIG. 28, if the first switch units $SW_5$ is removed, the second horizontal signal line 542 is directly connected to the second charge detection circuit 35B and the connection between the output terminals $t_{11}$ and $t_{12}$ is removed, i.e., the second switch units $SW_6$ is removed, then it is possible to construct the all pixel read out amplifying type solid-state imaging device.

According to the amplifying type solid-state imaging devices 56, 58, 60 and 61 shown in FIGS. 23, 26, 27 and 28, signal charges can be read at the frames unit.

When signal charges are read at the unit of frames unit, pixels are read out at every other row in an interlace scanning fashion. Particularly, according to this embodiment, when a signal charge is read out from the pixel MOS transistor 1 of the the ith row, for example, the first and second operation MOS switches 511 and 512 are simultaneously turned on to cause signal voltages (electric charges) of the pixel MOS transistor 1 of the same the ith row to be held in the first and second load capacitor elements 521 and 522. Then, the signal voltages are added through the first and second horizontal signal lines 541, 542, or one horizontal signal line 54. The added signal voltage is demodulated by the charge detection circuit 35 (in the case of FIGS. 23 and 26) or the charge detection circuit 35C (in the case of FIG. 27) or the charge detection circuit 35A (in the case of FIG. 28) and then the output signal is developed at the output terminal. At that time, the output signal is doubled and the S/N can be improved.

Figure 29:
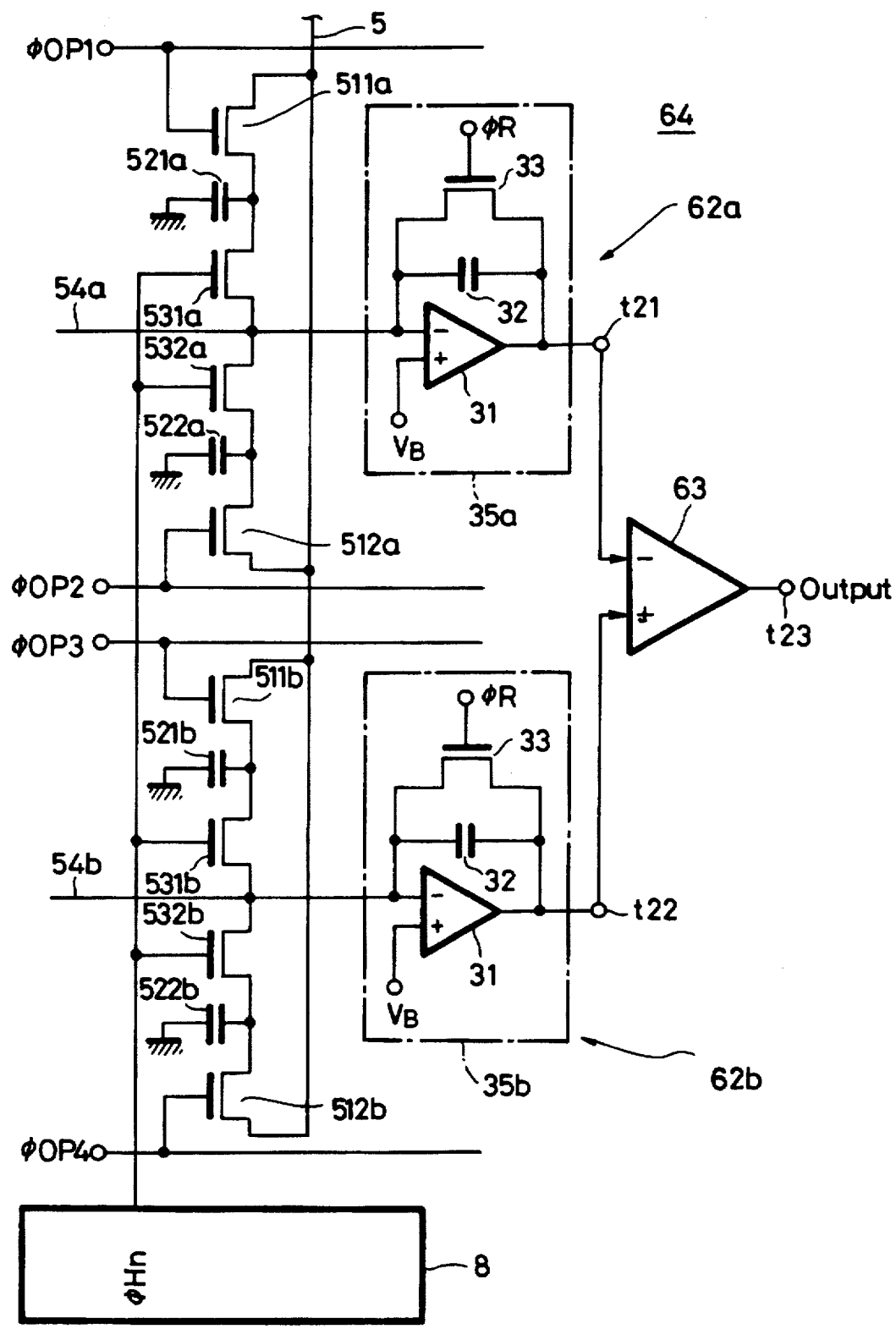
FIG. 29 is a circuit diagram showing a main portion, i.e., an output circuit portion of an amplifying type solid-state imaging device according to a seventh embodiment of the present invention.

FIG. 29 shows a seventh embodiment of the present invention. Amplifying type solid-state imaging devices in which each pixel has an amplifying action which suffers from a fixed pattern noise (FPN) that is peculiar to the pixel transistor. According to this embodiment, it becomes possible to eliminate the fixed pattern noise (FPN).

An amplifying type solid-state imaging device 64 shown in FIG. 29 is applied to the arrangement of FIG. 26. In FIG. 29, elements and parts identical to those of FIG. 26 are marked with the same references suffixed by reference symbols a and b, and therefore need not be described in detail.

FIG. 29 shows only a horizontal output circuit portion connected to the vertical signal line 5 of the n+1th column. Other arrangements, i.e., arrangements of the pixel MOS transistor 1, the vertical scanning circuit 2 or the like and the connection relationships are not shown, but are similar to those of FIG. 26 and therefore need not be described in detail.

According to the seventh embodiment shown in FIG. 29, a pair of horizontal output circuits which read out a mixed output signal of adjacent two pixels in the vertical direction, i.e., first and second horizontal output circuit portions 62 (62a, 62b) are connected in parallel to each vertical signal line 5 and output terminals $t_{21}$, $t_{22}$ thereof are connected to a subtracting circuit 63 composed of a differential amplifier or the like.

Specifically, in the first horizontal output circuit portion 62a, a first load capacitor element 521a is connected to the vertical signal line 5 through a first operation MOS transistor 511a and a junction therebetween is connected through a first horizontal MOS switch 531a to a first horizontal signal line 54a. A second load capacitor element 522a is connected through a second MOS operation transistor 512a to the first horizontal signal line 54a and a junction therebetween is connected through a second MOS switch 532a to the first horizontal signal line 54a. The first horizontal signal line 54a is connected to a first charge detection circuit 35a composed of the operational amplifier 31, the detection capacitor element 32 and the reset switch 33.

The first operation pulse $\phi_{OP1}$ is applied to the gate of the first operation MOS switch 511a and the second operation pulse $\phi_{OP2}$ is applied to the gate of the second operation MOS switch 512a.

In the second horizontal output circuit portion 62b, a third load capacitor element 521b is connected through a third operation MOS switch 511b to the vertical signal line 5 of the same column. A junction therebetween is connected through a third horizontal MOS switch 531b to a second horizontal signal line 54b. A fourth load capacitor element 522b is connected through a fourth operation MOS switch 512b to the second horizontal signal line 54b. A junction therebetween is connected through a fourth horizontal MOS switch 532b to the second horizontal signal line 54b. The second horizontal signal line 54b is connected to a second charge detection circuit 35b composed of the operational amplifier 31, the detection capacitor element 32 and the reset switch 33.

A third operation pulse $\phi_{OP3}$ is applied to the gate of the third operation MOS transistor 511b and a fourth operation pulse $\phi_{OP4}$ is applied to the gate of the fourth operation MOS transistor 512b.

The gates of the first, second, third and fourth horizontal MOS switches 531a, 532a, 531b and 532b of the first and second horizontal output circuit portions 62a, 62b are connected commonly and then connected to the horizontal scanning circuit 8.

Output terminals $t_{21}$ and $t_{22}$ of the charge detection circuits 35a and 35b of the first and second horizontal output circuit portions 62a and 62b are connected to respective input terminals of the subtracting circuit 63.

Figure 30:
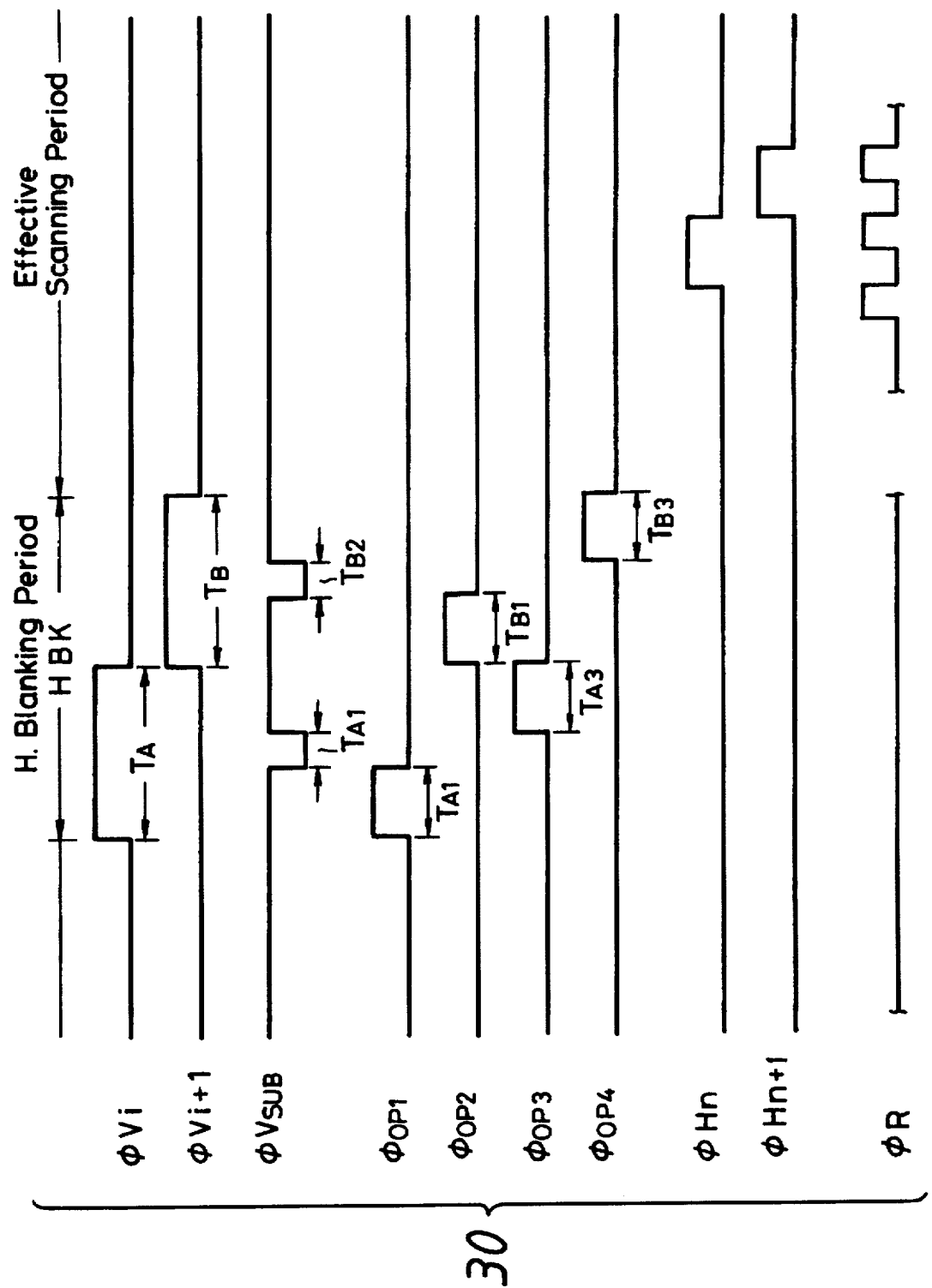
FIG. 30 is a timing chart used to explain operation of the amplifying type solid-state imaging device shown in FIG. 29.

Operation of the amplifying type solid-state imaging device 64 shown in FIG. 29 will be described with reference to a timing chart of FIG. 30.

Initially, the read out operation is carried out twice during a first half period $T_A$ of the horizontal blanking period HBK.

Specifically, the pixel MOS transistor 1 of the ith row is scanned upon application of the vertical scanning pulse $\phi V_i$ (high level) during the first half period $T_A$. Then, in synchronism with a first read period $T_{A1}$ of the first half period $T_A$, the first operation MOS switch 511a is turned on in response to the first operation pulse $\phi_{OP1}$ to energize the pixel MOS transistor 1 of the ith row. Then, when the first operation MOS switch 511a is turned off, a pixel signal voltage (pixel signal voltage containing a regular signal component and an FPN component) of the pixel MOS transistor 1 of the ith row is held in the first load capacitor element 521a.

During the next pixel reset period $T_A$, the substrate potential is set to the reset potential upon application of the substrate reset pulse $\phi V_{SUB}$ to discharge signal charges (holes) accumulated in the pixel MOS transistor 1 of the ith row to the substrate side, resetting the pixel MOS transistor 1 of the ith row.

Subsequently, during a second read period $T_A$, the third operation MOS transistor 511b is turned on in response to the third operation pulse $\phi_{OP3}$ synchronized with the second read period $T_{A3}$ so that the pixel MOS transistor 1 of the ith row is energized one more time. Then, when the third operation MOS switch 511b is turned off, a pixel signal voltage obtained after the pixel of the pixel MOS transistor 1 of the ith row had been reset, i.e., the FPN component voltage is held in the third load capacitor element 521b.

During the second half period $T_B$ of the horizontal blanking period HBK, the pixel MOS transistor of the i+1th row is scanned on application of the vertical scanning pulse $\phi V_{i+1}$. Then, during the first read period $T_{B1}$ of the second half period $T_B$ of the horizontal blanking period HBK, the second operation MOS switch 512a is turned on in response to the second operation pulse $\phi_{OP2}$ synchronized with the first read period $T_{B1}$ of the second half period $T_B$ so that the pixel MOS transistor 1 of the i+1th row is energized. Then, when the second operation MOS switch 512a is turned off, a pixel signal voltage (pixel signal voltage containing a regular signal component and an FPN component) of the pixel MOS transistor 1 of the i+1th row is held in the second load capacitor element 522a.

During the next pixel reset period $T_{B2}$, the substrate potential is set to the reset potential upon application of the substrate reset pulse $\phi V_{SUB}$ and signal charges (holes) accumulated in the pixel MOS transistor 1 of the i+1th row are discharged to the substrate side, resetting the pixel MOS transistor 1 of the i+1th row.

Subsequently, during a second read period $T_{B3}$, the fourth operation MOS switch 512b is turned on in response to the fourth operation pulse $\phi_{OP4}$ synchronized with the second read period $T_{B3}$ so that the pixel MOS transistor 1 of the i+1th row is energized one more time. Then, when the fourth operation MOS transistor 512b is turned off, a pixel signal voltage obtained after the pixel of the pixel MOS transistor 1 of the i+1th row had been reset, i.e., the FPN component voltage is held in the fourth load capacitor element 522b.

During the effective scanning period, the horizontal scanning pulses $\phi H$ ($\phi H_1, \ldots \phi H_n, \phi H_{n+1}, \ldots$) from the horizontal scanning circuit 8 are simultaneously applied to the gates of the first, second, third and fourth horizontal MOS switches 531a, 532a, 531b and 532b, whereby the horizontal MOS switches 531a, 532a, 531b and 532b are turned on simultaneously. Therefore, in the first horizontal output circuit portion 62a, the pixel signal voltages of the ith and the i+1th rows held in the first and second load capacitor elements 521a and 522a are added and then output to the first horizontal signal line 541a. The added pixel signal voltage is input to and demodulated by the first charge detection circuit 35a.

Further, in the second horizontal output circuit portion 62b, FPN component voltages held in the third and fourth load capacitor elements 521b, 522b after the pixel MOS transistors 1 of the ith row and the i+1th row had been reset are added and then output to the second horizontal signal line 541b. The added FPN component voltage is input to and demodulated by the second charge detection circuit 35b.

Then, the added and demodulated pixel signal and the FPN component output to the output terminals $t_{21}$ and $t_{22}$ of the first and second charge detection circuits 35a, 35b are input to the subtracting circuit 63, in which the FPN component obtained after the pixel of the pixel MOS transistor 1 had been reset is subtracted from the pixel signal. Thus, a field read output signal from which the fixed pattern noise (FPN) was removed is output at the output terminal $t_{23}$ of the subtracting circuit 63.

According to the amplifying type solid-state imaging device 64 shown in FIG. 29, when the field read out is carried out, there can be obtained the pixel output signal in which the fixed pattern noise (FPN) was removed. Therefore, it is possible to make the amplifying type solid-state imaging device of this kind reliable.

The aforesaid arrangement for eliminating the fixed pattern noise (FPN) can also be applied to other solid-state imaging devices, such as the solid-state imaging device shown in FIGS. 4, 21, 23, 27 and 28, though not shown.

While the solid-state imaging devices according to the embodiments of the invention use the pixel transistor based on MOS structure shown in FIG. 6, i.e., pixel MOS transistor 1 as the unit pixel, the present invention is not limited thereto and the solid-state imaging device according to the present invention can be composed of a pixel transistor of a bipolar structure, i.e., pixel bipolar transistor.

Figure 31A:
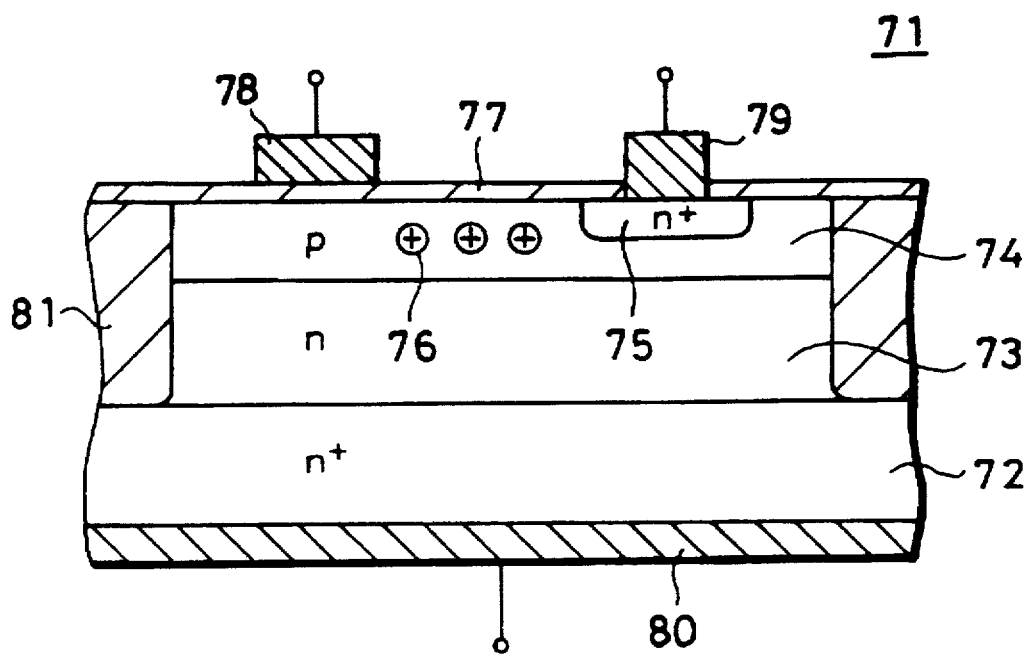
FIG. 31A is a cross-sectional view showing a semiconductor structure of a pixel bipolar transistor.
Figure 31B:
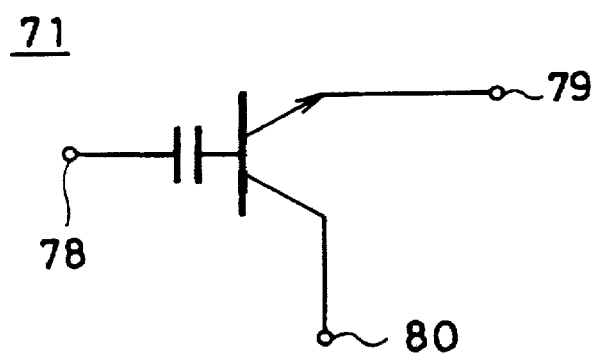
FIG. 31B is a schematic diagram showing an equivalent circuit of the pixel bipolar transistor.

FIG. 31A shows a semiconductor structure of a pixel bipolar transistor serving as a unit pixel, and FIG. 31B shows an equivalent circuit thereof.

As illustrated, a pixel bipolar transistor 71 includes a first conductivity type, e.g., n-type highly-doped silicon substrate 72 and a same conductivity type, e.g., n-type collector region 73, a second conductivity-type, e.g., p-type base region 74 in which photoelectrically-converted signal charges (holes) 76 are accumulated and an n-type emitter region 75 which are all sequentially formed on one end of the silicon substrate 72. A control electrode 78 is formed on the base region 74 through an insulating film 77 formed of an $SiO_2$ film or the like. An emitter electrode 79 is formed on the emitter region 75 and a collector electrode 80 is formed on the rear surface of the silicon substrate 72, respectively. In FIG. 31A, reference numeral 81 depicts a device separation region formed of an insulating layer, for example, for separating unit pixels.

In this pixel bipolar transistor 71, electrons generated when light becomes incident on the pixel bipolar transistor 71, i.e., holes 76 are accumulated in the base region 74 and a base potential is changed. Then, a read pulse is applied to the control electrode 78, whereby a read signal corresponding to the changed amount of the base potential is output from the emitter electrode 79. After the read signal was output, the signal charges 76 accumulated in the base region 74 are eliminated to the substrate 80 side by grounding the emitter electrode 79 and by applying the reset pulse of positive voltage to the control electrode 78.

While the pixel MOS transistor 1 is composed of the pixel structure of the n-channel MOS transistor as described above, the present invention is not limited thereto and the pixel MOS transistor may be composed of a pixel structure of a p-channel MOS transistor in which n-type and p-type impurities are inverted.

While the pixel bipolar transistor 71 according to this embodiment is composed, of the pixel structure of the npn bipolar transistor as described above, the present invention is not limited thereto and may be composed of a pixel structure of a pnp bipolar transistor in which n-type and p-type of impurity are inverted.

In the case of the above examples, it is possible to apply the above-mentioned pixel structures to the present invention only by inverting the polarity of applied voltage.

While the operational amplifier is used as the inverting amplifier forming the charge detection circuit as described above, the present invention is not limited thereto and it is possible to use other inverting amplifiers.

According to the solid-state imaging device of the present invention, the signal charge accumulated in the signal charge accumulation means is demodulated by the so-called charge detection circuit including the inverting amplifier and the first detection capacitor, thereby obtaining a large and rectangular signal output.

According to the solid-state imaging device of the present invention, when the signal charges of two different pixels in the column direction are accumulated in the first and second accumulation means and the two signal charges are mixed and then demodulated by the so-called charge detection circuit including the inverting amplifier and the first detection capacitor, the field read out corresponding to the interlace scanning can be carried out. When the signal charges of every other pixels in the column direction are accumulated in the first and second accumulation means, i.e., the signal charges of the same pixel are accumulated in the first and second accumulation means and the signal charges of the two accumulation means are mixed and then demodulated by the charge detection circuit, the so-called frame read out which is the so-called interlaced scanning can be carried out.

According to the solid-state imaging device of the present invention, since signal charges from adjacent light receiving elements in the column direction are accumulated in the first and second accumulation means, it is possible to carry out the field read out.

According to the solid-state imaging device of the present invention, it is possible to carry out the so-called all pixel read out.

According to the solid-state imaging device of the present invention, it is possible to selectively carry out the field read out or the all pixel read out.

According to the solid-state imaging device of the present invention, it is possible to remove the fixed pattern noise in the signal output.

According to the solid-state imaging device of the present invention, since the first capacitor constructing the charge detection circuit is reset after the signal output was read out, the next signal outputs can be read out sequentially.

According to the solid-state imaging device of the present invention, since the first and second capacitors constructing the charge detection circuit are reset after the signal output was read out, of the next signal outputs can be read out sequentially.

According to the solid-state imaging device of the present invention, since the capacitor constructing the charge detection circuit is reset after the signal output was read out, the next signal outputs can be read out sequentially.

According to the solid-state imaging device of the present invention, since the light receiving element is composed of the transistor, it is possible to construct the amplifying type solid-state imaging device in which the pixel has the amplifying action.

According to the solid-state imaging device of the present invention, since the third capacitor is used as the accumulation means, it is possible to construct the solid-state imaging device of capacitor load operation system.

According to the solid-state imaging device of the present invention, since the gain of the inverting amplifier is set such that the random noise generated from the inverting amplifier composing a part of the charge detection circuit may not exceed 10 times of the kTC noise generated from the capacitor connected in parallel to the accumulation means or the inverting amplifier, it is possible to maximize the S/N of the signal output.

According to the solid-state imaging device of the present invention, since the capacitor connected in parallel to the inverting amplifier starts being reset during a signal input period, it is possible to reduce the number of horizontal shift registers forming the horizontal scanning circuit, i.e., transistors. Therefore, the period in which the signal output is stabilized can be extended and the solid-state imaging device can be driven at a higher frequency. Thus, the present invention can be applied to a solid-state imaging device of high definition satisfactorily.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A solid-state imaging device, comprising:

a plurality of pixels arrayed in a matrix fashion;

a plurality of vertical signal lines disposed at every column of said pixels for sending a signal of each pixel;

each vertical signal line connecting to a first load capacitor element through a first operation switch and also to a second load capacitor element through a second operation switch, the first and second operation switches being controlled by respective first and second operation pulses;

a single mixing switch only connected between the first and second load capacitor elements, said single mixing switch being controlled by a mixing operation pulse;

a horizontal switch connecting between one of said first and second load capacitor elements and a horizontal signal line, said horizontal signal line feeding a charge detection circuit; and a horizontal scanning circuit outputting horizontal scanning pulses for controlling each horizontal switch associated with each vertical signal line.

2. A solid-state imaging device according to claim 1 wherein said first and second load capacitor elements store signals supplied thereto from adjacent pixels in a column direction.

3. A solid-state imaging device according to claim 1 wherein said charge detection circuit comprises an operational amplifier having a detection capacitor element connected between an output of the amplifier and a first input thereof and a reset switch controlled by a reset pulse also connected between said output of said amplifier and said first input, a second input of said operational amplifier being connected to a voltage potential.

4. A solid-state imaging device according to claim 1 wherein all of said switches are MOS switches.

5. A solid-state imaging device, comprising:
   a plurality of pixels arrayed in a matrix fashion, each of said pixels amplifying and outputting an electric charge generated from each of said pixels when light becomes incident on each of said pixels;
   vertical signal lines disposed at every column of said pixels for sending a signal of each pixel;
   a load capacitor connected through an operation switch to each of said vertical signal lines, each operation switch being controlled by an operation pulse;
   a horizontal signal line connected to each of said load capacitors through respective horizontal switches, each of said horizontal switches being controlled by a respective horizontal scanning pulse from a horizontal scanning circuit;
   a charge detection integrating circuit connected to said horizontal signal line, said integrating circuit comprising an inverting amplifier having a first input connected to the horizontal signal line and a second input connected to a voltage potential, a feedback capacitor connected between an output of said amplifier and said first input, and a reset switch controlled by a reset pulse connected between said output of said amplifier and said first input of said amplifier;
   two of said reset switches provided in parallel with one another between said output and said first input of said amplifier, said first and second reset switches being MOS transistors of opposite polarity, and respective reset pulses to said first and second reset switches being of opposite polarity with respect to each other; and
   said inverting amplifier having a gain selected such that a random noise generated from said inverting amplifier does not exceed ten times a kTC noise generated from one of the elements selected from the group consisting of said load capacitor and said feedback capacitor.

6. A solid-state imaging device according to claim 5 wherein all of said switches are MOS switches.

7. A solid-state imaging device, comprising:
   a plurality of pixels arrayed in a matrix fashion, each of said pixels amplifying and outputting an electric charge generated from each of said pixels when light becomes incident on each of said pixels;
   vertical signal lines disposed at every column of said pixels for sending a signal of each pixel;
   a load capacitor connected through an operation MOS switch to each of said vertical signal lines, each operation MOS switch being controlled by an operation pulse;
   a horizontal signal line connected to each of said load capacitors through respective horizontal MOS switches, each of said horizontal MOS switches being controlled by a respective horizontal scanning pulse from a horizontal scanning circuit;
   an integrating circuit connected to said horizontal signal line, said integrating circuit comprising an inverting amplifier having a first input connected to the horizontal signal line and a second input connected to a voltage potential, a feedback capacitor connected between an output of said amplifier and said first input, and a MOS reset switch controlled by a reset pulse connected between said output of said amplifier and said first input of said amplifier;
   said horizontal scanning circuit outputting said horizontal scanning pulses sequentially and continuously; and
   said horizontal scanning circuit comprising a plurality of serially-connected shift register stages, each shift register stage being formed of two p-channel and two n-channel MOS transistors connected in series between first and second potentials, outermost p and n-channel transistors receiving a control pulse at their gate electrodes and innermost p and n-channel transistors receiving respective clock pulses at their gate electrodes.

* * * * *